(12) United States Patent
Liu et al.

(10) Patent No.: US 11,025,402 B2
(45) Date of Patent: Jun. 1, 2021

(54) METHOD FOR SENDING AND DETERMINING TIMING INFORMATION, APPARATUS, STORAGE MEDIUM, AND PROCESSOR

(71) Applicant: ZTE CORPORATION, Guangdong (CN)

(72) Inventors: Xing Liu, Shenzhen (CN); Peng Hao, Shenzhen (CN); Feng Bi, Shenzhen (CN); Ting Miao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/714,093

(22) Filed: Dec. 13, 2019

(65) Prior Publication Data

US 2020/0328869 A1   Oct. 15, 2020

Related U.S. Application Data

(63) Continuation of application No. PCT/CN2018/089791, filed on Jun. 4, 2018.

(30) Foreign Application Priority Data

Jun. 16, 2017   (CN) .......................... 201710459642.1

(51) Int. Cl.
*H04L 5/10*   (2006.01)
*H04L 5/00*   (2006.01)
*H04W 56/00*   (2009.01)
*H04W 72/00*   (2009.01)

(52) U.S. Cl.
CPC .............. *H04L 5/10* (2013.01); *H04L 5/0051* (2013.01); *H04W 56/001* (2013.01); *H04W 72/005* (2013.01)

(58) Field of Classification Search
CPC combination set(s) only.
See application file for complete search history.

(56) References Cited

U.S. PATENT DOCUMENTS

| 2017/0006578 A1* | 1/2017 | Rico Alvarino ...... H04L 1/0038 |
| 2018/0262308 A1* | 9/2018 | Si ........................ H04L 27/2613 |
| 2018/0270772 A1* | 9/2018 | Ly ........................ H04L 5/0053 |

(Continued)

FOREIGN PATENT DOCUMENTS

| CN | 104125037 A | 10/2014 |
| CN | 105191247 A | 12/2015 |

(Continued)

OTHER PUBLICATIONS

International Search Report and Written Opinion for International Appl. No. PCT/CN2018/089791, dated Aug. 24, 2018.

(Continued)

*Primary Examiner* — Xavier S Wong

(74) *Attorney, Agent, or Firm* — Foley & Lardner LLP

(57) ABSTRACT

Embodiments of the present invention provide a method and apparatus for transmitting and determining timing information, a storage medium, and a processor. The transmitting method includes: carrying timing information by using a demodulation reference signal (DMRS), where the timing information is used to indicate a terminal to determine a time domain location; and transmitting the DMRS carrying the timing information to the terminal.

18 Claims, 17 Drawing Sheets

Multiplexing manner 1

Multiplexing manner 2

Multiplexing manner 3

Multiplexing manner 4

Multiplexing manner 5

Multiplexing manner 6

Multiplexing manner 7

Multiplexing manner 8

(56) References Cited

U.S. PATENT DOCUMENTS

| | | | | |
|---|---|---|---|---|
| 2018/0368054 A1* | 12/2018 | Sheng | | H04L 5/0048 |
| 2019/0058620 A1* | 2/2019 | Liu | | H04W 48/12 |
| 2019/0357159 A1* | 11/2019 | Pan | | H04L 1/1861 |
| 2019/0387488 A1* | 12/2019 | Wang | | H04L 5/0051 |

FOREIGN PATENT DOCUMENTS

| | | |
|---|---|---|
| CN | 105263188 A | 1/2016 |
| CN | 106105070 A | 11/2016 |
| WO | WO-2017/004087 A1 | 1/2017 |

OTHER PUBLICATIONS

Extended European Search Report for EP Appl. No. 18818022.8, dated Jun. 9, 2020 (5 pages).

Fujitsu "Consideration on SS block time index indication", 3GPP TSG RAN WG1 Meeting #89, May 15-19, 2017, pp. 1-4, R1-1707252, Hangzhou, P.R. China.

Fujitsu "NR-PBCH design", 3GPP TSG RAN WG1 Meeting #89, Apr. 15-19 2017, pp. 1-10, R1-1707253, Hangzhou, China.

First Exam Report on IN Application No. 202037001551 dated Mar. 12, 2021 (5 pages).

* cited by examiner

A first SS block in a slot    A second SS block in a slot

METHOD FOR SENDING AND DETERMINING TIMING INFORMATION, APPARATUS, STORAGE MEDIUM, AND PROCESSOR

CROSS-REFERENCE TO RELATED APPLICATIONS

This application claims the benefit of priority under 35 U.S.C. § 120 as a continuation of PCT Patent Application No. PCT/CN2018/089791, filed on Jun. 4, 2018, which claims priority to Chinese patent application No. 201710459642.1, filed on Jun. 16, 2017, the content of each of which is hereby incorporated by reference in its entirety.

TECHNICAL FIELD

The present invention relates to the field of communications, and in particular to a method and apparatus for transmitting and determining timing information, a storage medium, and a processor.

BACKGROUND

In the current standard discussion, a physical broadcast channel (PBCH) is recommended to indicate timing information. Specifically, implicit indication by PBCH is a potential method, that is, a different PBCH processing manner (for example, redundancy version (RV), scrambling code, cyclic redundancy check mask (CRC mask)) is used in a different synchronization signal block (SS block) to imply index information of the SS block.

In a high frequency band, it is necessary to consider supporting up to 64 or more SS blocks, and this means that if the above information is implicitly carried by a PBCH alone, on the one hand, it may not be possible to imply so much index information (for example, in the manner of indicating different SS block indexes by using different RVs, 40 bits of PBCH are typically used as an example, different cyclic shifts correspond to different RVs, and in the case where a cyclic shift interval is 1, there are at most 40 different cyclic shifts, which is unable to meet indication requirements of 64 or more different SS block indexes); on the other hand, it will bring huge blind detection overhead to a terminal, and 64 or more different configurations need to be attempted to decode the PBCH.

More importantly, when a neighbor cell is measured and reported, the terminal needs to report a measurement result corresponding to an SS block index. If the index needs to be obtained by decoding the PBCH, the terminal needs to further receive the PBCH on the measured neighbor cell, which will bring huge overhead to the terminal.

With the continuous advancement of radio technology, a variety of radio services have emerged in large quantity, and spectrum resources relied by the radio services are limited. In the face of people's increasing demand for bandwidth, spectrum resources between 300 MHz-3 GHz mainly used for traditional commercial communication exhibit extremely tight scenario and cannot meet the needs of future wireless communications.

In future wireless communications, communication will be carried out using a carrier frequency higher than that used in fourth-generation (4G) communication systems, such as 28 GHz, 45 GHz, 70 GHz, etc., and such high-frequency channel has disadvantages of large free propagation losses, easy absorption by oxygen, and great influence from rain attenuation, seriously affecting coverage performance of high-frequency communication systems. However, since a carrier frequency corresponding to high-frequency communication has a shorter wavelength, it is possible to ensure that more antenna elements can be accommodated per unit area, and more antenna elements mean that a beam-forming method may be used to improve an antenna gain, thereby ensuring the coverage performance of the high frequency communication.

After the beam-forming method is adopted, a transmitting end can concentrate transmitting energy in a certain direction, and energy is small or absent in other directions, that is, each beam has its own directivity, and each beam can only cover a terminal in a certain direction, and the transmitting end, that is, a base station, needs to transmit a beam in dozens or even hundreds of directions to complete full coverage. In the existing art, measurement and identification of a preliminary beam direction are tend to be performed during an initial access of a terminal to a network, and transmit beams at a base station side are swept once in a time interval for the terminal to measure and identify a preferred beam or port. FIG. 1 is a structural diagram of a synchronization signal burst set (SS burst set) in the related art. As shown in FIG. 1, this structure is a sweeping resource for transmitting a synchronization signal and a physical broadcast channel, where the SS burst set includes one or more synchronization signal bursts (SS bursts), one SS burst includes one or more synchronization signal blocks (SS blocks), each SS block carries a synchronization signal in a specific beam, a specific port or a specific port set, and once the SS burst set completes sweeping of the beam, all beam transmissions or all port transmissions are completed. The SS block may further include a PBCH, a demodulation reference signal corresponding to the PBCH, other control channels, a data channel, and other signals. Since multiple SS blocks are mapped to the same subframe, offsets of different SS blocks with respect to the subframe boundary are different, and terminals at different locations may successfully detect the synchronization signal in any SS block. In order to complete subframe timing, the terminals need to know time index information of the SS block currently synchronized.

In the current standard discussion, a PBCH is recommended to indicate timing information. Specifically, implicit indication by PBCH is a potential method, that is, a different PBCH processing manner (for example, redundancy version (RV), scrambling code, cyclic redundancy check mask (CRC mask)) is used in a different synchronization signal block (SS block) to imply index information of the SS block.

In a high frequency band, it is necessary to consider supporting up to 64 or more SS blocks, and this means that if the above information is implicitly carried by a PBCH alone, on the one hand, it may not be possible to imply so much index information (for example, in the manner of indicating different SS block indexes by using different RVs, 40 bits of PBCH are typically used as an example, different cyclic shifts correspond to different RVs, and in the case where a cyclic shift interval is 1, there are at most 40 different cyclic shifts, which is unable to meet indication requirements of 64 or more different SS block indexes); on the other hand, it will bring huge blind detection overhead to a terminal, and 64 or more different configurations need to be attempted to decode the PBCH.

More importantly, when a neighbor cell is measured and reported, the terminal needs to report a measurement result corresponding to an SS block index. If the index needs to be obtained by decoding the PBCH, the terminal needs to further receive the PBCH on the measured neighbor cell, which will bring huge overhead to the terminal.

How to reduce an overhead of the above method and reduce a capacity requirement for indication is a problem that shall be considered in an NR design of wireless access technology.

In view of the above problems, an effective solution has not been proposed in the related art.

SUMMARY

Embodiments of the present invention provide a method and apparatus for transmitting and determining timing information, a storage medium, and a processor, so as to at least solve problems that a terminal has a large overhead and a large capacity requirement in the related art.

According to an embodiment of the present invention, provided is a method for transmitting timing information, including: carrying timing information by using a demodulation reference signal (DMRS), where the timing information is used to indicate a terminal to determine a time domain location; and transmitting the DMRS carrying the timing information to the terminal.

According to another embodiment of the present invention, further provided is a method for determining timing information, including: receiving a DMRS transmitted by a base station; and determining timing information carried in the DMRS, where the timing information is used to indicate a terminal to determine a time domain location.

According to another embodiment of the present invention, further provided is a method for mapping a coded bit of a physical broadcast channel (PBCH), including: determining the coded bit of the PBCH; and mapping the coded bit of the PBCH to a resource of the PBCH in a predetermined order.

According to another embodiment of the present invention, further provided is an apparatus for transmitting timing information, including: a carrying module, which is configured to carry timing information by using a DMRS, where the timing information is used to indicate a terminal to determine a time domain location; and a transmitting module, which is configured to transmit the DMRS carrying the timing information to the terminal.

According to another embodiment of the present invention, further provided is an apparatus for determining timing information, including: a receiving module, configured to receive a DMRS transmitted by a base station; and a first determining module, configured to determine timing information carried in the DMRS, where the timing information is used to indicate a terminal to determine a time domain location.

According to another embodiment of the present invention, further provided is an apparatus for mapping a coded bit of a PBCH, including: a second determining module, configured to determine the coded bit of the PBCH; and a mapping module configured to map the coded bit of the PBCH to a resource of the PBCH in a predetermined order.

According to another embodiment of the present invention, further provided is a storage medium including a stored program, where the program executes the method of any of the above during running.

According to another embodiment of the present invention, further provided is a processor for executing a program, where the program executes the method of any of the above during running.

According to embodiments of the present invention, a base station carries timing information by using a DMRS, where the timing information is used to indicate a terminal to determine a time domain location, and the base station transmits the DMRS carrying the timing information to the terminal for indicating the terminal to acquire the timing information according to the DMRS. Therefore, problems of a large terminal overhead and a large capacity requirement existing in the related art could be solved, and effects of cutting down the terminal overhead and reducing the terminal capacity requirement could be achieved.

BRIEF DESCRIPTION OF DRAWINGS

The drawings described herein are intended to provide a further understanding of the present invention, and form a part of the present application. Illustrative embodiments of the present invention and description thereof are intended to explain the present invention, and do not constitute limitation to the present invention. In the drawings.

DETAILED DESCRIPTION

Embodiments of the present invention will be illustrated in detail below with reference to the drawings. It shall be noted that the embodiments of the present invention and features in the embodiments may be combined with each other without conflict.

Figure 1:
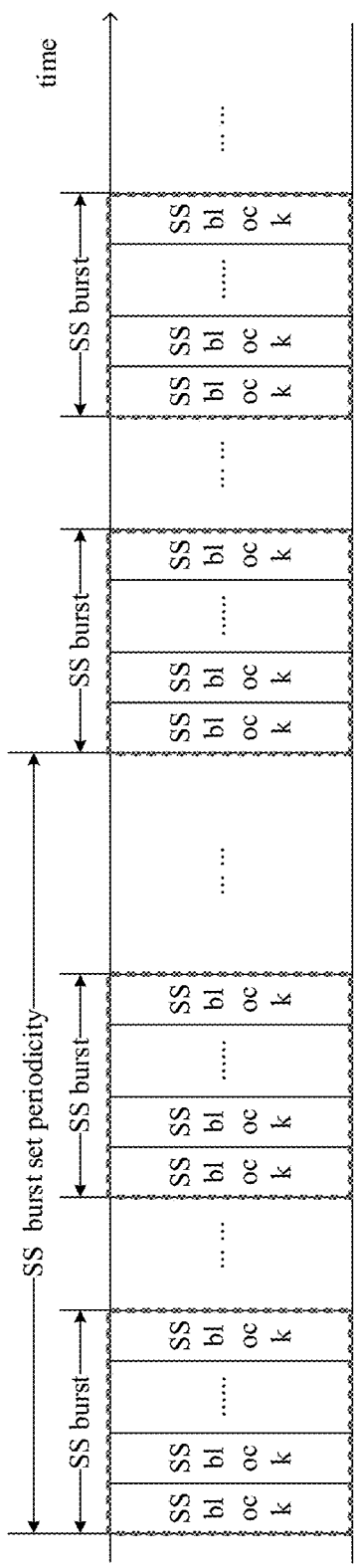
FIG. 1 is a structural diagram of a synchronization signal burst set in the related art.
Figure 2:
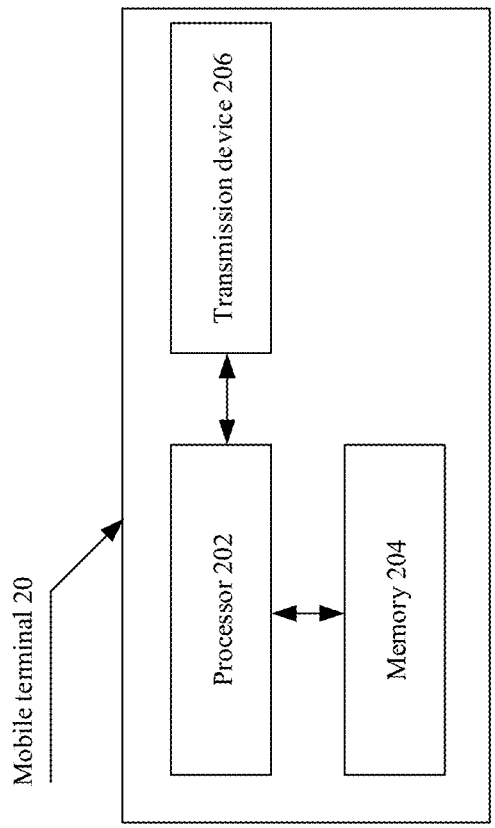
FIG. 2 is a block diagram of a hardware structure of a mobile terminal according to an embodiment of the present invention.

It should be noted that terms "first", "second" and the like in the description and claims of the present invention and the above accompany drawings are used for distinguishing similar objects, but are not necessarily used for describing a particular order or a precedence order. Method embodiments provided by embodiments of the present application may be implemented in a mobile terminal, a computer terminal, or a similar computing apparatus. Taking operation on a mobile terminal as an example, FIG. 2 is a block diagram of a hardware structure of a mobile terminal according to an embodiment of the present invention. As shown in FIG. 2, a mobile terminal 20 may include one or more (merely one is shown in FIG. 2) processors 202 (the processor 202 may include, but is not limited to, a processing device such as a microprogrammed control unit (MCU) or a field programmable gate array (FPGA)), a memory 204 for storing data, and a transmission device 206 for communication functions. It will be understood by those skilled in the art that the structure shown in FIG. 2 is merely illustrative and does not limit the structure of the above electronic device. For example, the mobile terminal 20 may also include more or fewer components than those shown in FIG. 2, or have a different configuration than that shown in FIG. 2.

The memory 204 may be used to store software programs and modules of the application software, such as program instructions/modules corresponding to a method for transmitting timing information in the embodiment of the present invention, and the processor 202 executes various functional applications and data processing by executing the software programs and modules stored in the memory 204, that is, the above method is implemented. The memory 204 may include a high speed random access memory and may also include a non-volatile memory, such as one or more magnetic storage devices, a flash memory, or other non-volatile solid state memories. In some examples, the memory 204 may further include a memory remotely located relative to the processor 202, which may be connected to a mobile terminal 10 over a network. Examples of such networks include, but are not limited to, the Internet, intranets, local area networks, mobile communication networks, and combinations thereof.

The transmission device 206 is configured to receive or transmit data via a network. The above specific network example may include a wireless network provided by a communication provider of the mobile terminal 20. In one example, the transmission device 206 includes a network interface controller (NIC) that may be connected to other network devices through a base station to communicate with the Internet. In one example, the transmission device 206 may be a radio frequency (RF) module for communicating with the Internet wirelessly.

Figure 3:
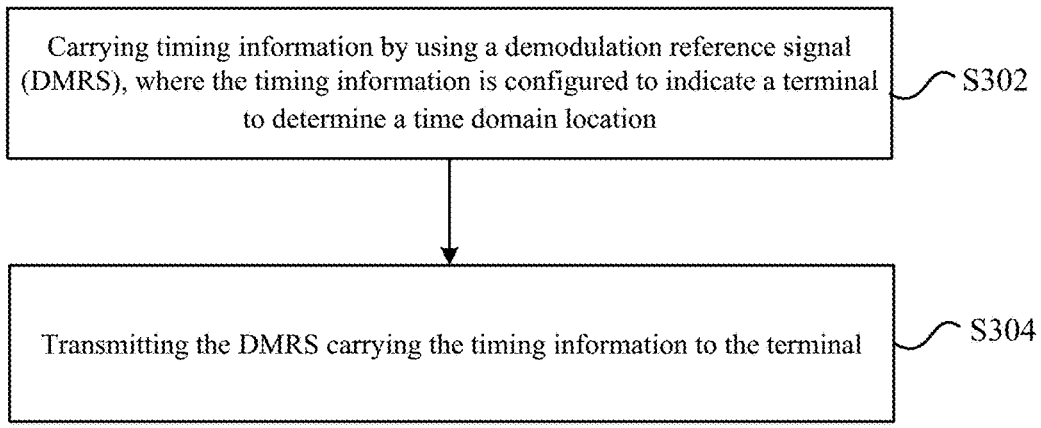
FIG. 3 is a flowchart of transmitting timing information according to an embodiment of the present invention.

This embodiment provides a method for transmitting timing information. FIG. 3 is a flowchart of transmitting timing information according to an embodiment of the present invention. As shown in FIG. 3, the flow includes a step S302 and a step S304. In step S302, carrying timing information by using a DMRS, where the timing information is used to indicate a terminal to determine a time domain location. In step S304, transmitting the DMRS carrying the timing information to the terminal.

Through the above steps, a base station carries timing information by using a DMRS, where the timing information is used to indicate a terminal to determine a time domain location; and the DMRS that carries the timing information is transmitted to the terminal, and the terminal is indicated to acquire the timing information according to the DMRS. Therefore, problems of a large terminal overhead and a large capacity requirement existing in the related art could be solved, and effects of cutting down the terminal overhead and reducing the terminal capacity requirement could be achieved.

Optionally, an execution body of the above steps may be a base station, but is not limited thereto.

In this embodiment, the determination of a time domain location by the terminal may include the determination of at least one of: subframe timing, slot timing, synchronization signal burst timing, synchronization signal burst set timing, half frame timing, radio frame timing, and a system frame number (SFN). Specifically, the subframe timing refers to a terminal determining a subframe boundary according to timing information; the slot timing refers to a terminal determining a slot boundary according to timing information; the synchronization signal burst timing refers to a terminal determining a boundary of a synchronization signal burst according to timing information; the synchronization signal burst set timing refers to a terminal determines a synchronization signal burst set boundary according to timing information; the half frame timing refers to a terminal determining a half frame boundary according to timing information, and distinguishing first and second half frames; the radio frame timing refers to a terminal determining a radio frame boundary according to timing information; the determination of the system frame number refers to a terminal determining a system frame number according to timing information.

In other embodiments, the timing information includes at least one of: a serial number of a synchronization signal burst set; a serial number of a synchronization signal burst in a synchronization signal burst set; a serial number of a slot in a synchronization signal burst; a serial number of an SS block in a slot; a serial number of an SS block in a synchronization signal burst set; a serial number of an SS block in a synchronization signal burst; a serial number of a slot in a synchronization signal burst set; a synchronization signal block index; N least significant bits of a synchronization signal block index, where N is a positive integer; M most significant bits of a synchronization signal block index, where M is a positive integer; X middle significant bits of a synchronization signal block index, where X is a positive integer; part or all of information of a SFN; radio frame timing information; and half frame timing information.

In other embodiments, the carrying the timing information by using the DMRS includes: carrying the timing information by using at least one of the following attributes of the DMRS: a DMRS sequence; a mapping resource of the DMRS sequence; and an orthogonal sequence used by the DMRS sequence.

In other embodiments, the DMRS sequence includes one of: DMRS sequences commonly mapped to two PBCH symbols; and DMRS sequences mapped to two PBCH symbols respectively. In this embodiment, it is preferable to perform a related operation according to two PBCH symbols, or to perform the above operation according to more than two PBCH symbols. The DMRS sequence includes: DMRS sequences commonly mapped to N physical broadcast channel (PBCH) symbols, where N is an integer greater than or equal to 2.

In other embodiments, the carrying the timing information by using the DMRS sequence includes one of: presetting a plurality of DMRS sequences and a correspondence relationship between respective DMRS sequences and values of the timing information, and carrying the timing information by using DMRS sequences commonly mapped to two PBCH symbols; and forming a DMRS sequence combination with DMRS sequences mapped to two PBCH symbols, presetting a plurality of DMRS sequence combinations and a correspondence relationship between the respective DMRS sequence combinations and values of the timing information, and carrying the timing information by using the DMRS sequence combination mapped to the two PBCH symbols respectively. In this embodiment, the preset DMRS sequences and the preset DMRS sequence combinations may be determined in the following manners: defining a plurality of DMRS sequences by commonly mapping one DMRS sequence on two PBCH symbols; and mapping one DMRS sequence on each of two PBCH symbols independently, forming a DMRS sequence combination with DMRS sequences mapped to the two PBCH symbols, and defining a plurality of DMRS sequence combinations.

In other embodiments, carrying the timing information by using a mapping order of the DMRS sequence includes one of: presetting a plurality of mapping orders and a correspondence relationship between different mapping orders and different values of the timing information, and carrying the timing information by using the mapping orders, where the mapping orders refer to orders of mapping DMRS sequences to DMRS time domain resources and/or frequency domain resources on two PBCH symbols; and presetting a plurality of mapping order combinations and a correspondence relationship between different mapping order combinations and values of the timing information, and carrying the timing information by using the mapping order combinations, where the mapping order combinations refer to combinations of orders of mapping DMRS sequences to DMRS time domain resources and/or frequency domain resources on two PBCH symbols respectively. In this embodiment, the preset mapping orders and the preset DMRS sequence mapping order combinations are determined in the following manners: commonly mapping a DMRS sequence to two PBCH symbols, and defining a plurality of orders of mapping the DMRS sequence to time domain resources and/or frequency domain resources; and independently mapping one DMRS sequence on each of two PBCH symbols, and defining a plurality of orders of mapping the DMRS sequence to time domain resources and/or frequency domain resources of a PBCH symbol.

In other embodiments, carrying the timing information by using the orthogonal sequence used by the DMRS sequence includes: presetting a plurality of orthogonal sequences having lengths correspond to PBCH symbol numbers, where different orthogonal sequences represent different values of the timing information; and mapping processed DMRS sequences to DMRS resources of the two PBCH symbols respectively by using the preset orthogonal sequences, and carrying the timing information by using the processed DMRS sequences.

In other embodiments, the preset orthogonal sequences include at least one of: [1, 1]; and [1, −1].

In other embodiments, processing the two DMRS sequences on the two PBCH symbols by using the preset orthogonal sequences includes one of: multiplying respective elements of a DMRS sequence on a first PBCH symbol by a first element of the orthogonal sequences, and mapping the multiplying results to a DMRS resource element of the first PBCH symbol respectively; and multiplying respective elements of a DMRS sequence on a second PBCH symbol by a second element of the orthogonal sequences, and mapping the multiplying results to DMRS resource elements of the second PBCH symbol respectively; and multiplying respective elements of a DMRS sequence on a first PBCH symbol by a first element of a first orthogonal sequence respectively to obtain a first sequence, multiplying respective elements of a DMRS sequence on a second PBCH symbol by a second element of the first orthogonal sequence to obtain a second sequence, and adding corresponding elements of the first sequence and the second sequence respectively, and mapping the adding results to DMRS resource elements of the first PBCH symbol respectively; and multiplying respective elements of a DMRS sequence on a second PBCH symbol by a first element of a second orthogonal sequence to obtain a third sequence, multiplying respective elements of a DMRS sequence on a second PBCH symbol by a second element of the second orthogonal sequence to obtain a fourth sequence, adding corresponding elements of the first sequence and the second sequence respectively, and mapping the adding results to DMRS resource elements of the second PBCH symbol respectively.

In other embodiments, the method further includes: carrying the timing information by using an attribute of the DMRS and an attribute of the PBCH.

In other embodiments, the attribute of the PBCH includes at least one of: bit information carried by the PBCH; a cyclic shift of a coded bit of the PBCH; a scrambling code of the PBCH; and a cyclic redundancy check mask of the PBCH.

The method further includes: carrying the timing information by using a DMRS sequence and bit information carried by a PBCH. In other embodiments, carrying the timing information by using the DMRS sequence and the bit information carried by the PBCH includes: when a number of candidate synchronization signal blocks is 64, defining eight different DMRS sequences for indicating three least significant bits of a synchronization signal block index; and introducing three bits of explicit information in PBCH information bits for indicating three most significant bits of a synchronization signal block index.

In other embodiments, the mapping resource of the DMRS sequence includes at least one of: a part of resource elements (REs) in a frequency band outside a synchronization signal in a PBCH symbol to which the DMRS sequence is mapped; a part of REs in a PBCH bandwidth in a PBCH symbol to which the DMRS sequence is mapped; and in a part of PBCH symbols, a part of resource elements (REs) in a frequency band outside a synchronization signal to which the DMRS sequence is mapped; and in remaining PBCH symbols, a part of REs in a PBCH bandwidth to which the DMRS sequence is mapped.

Figure 4:
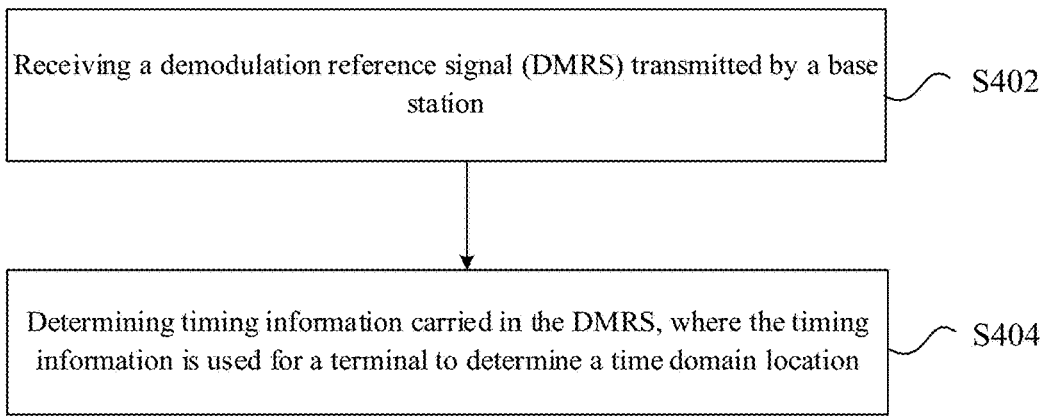
FIG. 4 is a flowchart of a method for determining timing information according to an embodiment of the present invention.

This embodiment provides a method for determining timing information. FIG. 4 is a flowchart of a method for determining timing information according to an embodiment of the present invention. As shown in FIG. 4, the flow includes a step S402 and a step S404.

In step S402, receiving a DMRS transmitted by a base station.

In step S404, determining timing information carried in the DMRS, where the timing information is used to indicate a terminal to determine a time domain location.

Through the above steps, a terminal acquires timing information from a DMRS by receiving the DMRS transmitted by a base station. Therefore, problems of a large terminal overhead and a large capacity requirement existing in the related art could be solved, and effects of cutting down the terminal overhead and reducing the terminal capacity requirement could be achieved.

Optionally, an execution body of the above steps may be a terminal, but is not limited thereto. In other embodiments, the timing information includes at least one of: a serial number of a synchronization signal burst set; a serial number of a synchronization signal burst in a synchronization signal burst set; a serial number of a slot in a synchronization signal burst; a serial number of an SS block in a slot; a serial number of an SS block in a synchronization signal burst set; a serial number of an SS block in a synchronization signal burst; a serial number of a slot in a synchronization signal burst set; a synchronization signal block index; N least significant bits of a synchronization signal block index, where N is a positive integer; M most significant bits of a synchronization signal block index, where M is a positive integer; X middle significant bits of a synchronization signal block index, where X is a positive integer; part or all of information of a system frame number (SFN); radio frame timing information; and half frame timing information.

In other embodiments, determining the timing information carried in the DMRS includes: determining the timing information by using at least one of the following attributes of the identified DMRS: a DMRS sequence; a mapping order of the DMRS sequence; and an orthogonal sequence used by the DMRS sequence.

In other embodiments, the DMRS sequence includes one of: DMRS sequences commonly mapped to two PBCH symbols; and DMRS sequences respectively mapped to two PBCH symbols.

In other embodiments, determining the timing information by using the DMRS sequence includes one of: determining the timing information by using DMRS sequences commonly mapped to the two PBCH symbols and a correspondence relationship between preset DMRS sequences and values of the timing information; and determining the timing information by using DMRS sequences respectively mapped to two PBCH symbols and a correspondence relationship between preset DMRS sequence combinations and values of the timing information.

In other embodiments, determining the timing information by using the mapping order of the DMRS sequence includes one of: determining the timing information by using mapping orders of DMRS sequences commonly mapped to two PBCH symbols and a correspondence relationship between preset mapping orders of DMRS sequences and values of the timing information; and determining the timing information by using mapping orders of DMRS sequences independently mapped to two PBCH symbols respectively and a correspondence relationship between preset mapping order combinations of DMRS sequences on respective PBCH symbols and values of the timing information.

In other embodiments, determining the timing information according to the orthogonal sequence used by the DMRS sequence includes: determining the timing information by using orthogonal sequences used by DMRS sequences mapped to two PBCH symbols and a correspondence relationship between preset orthogonal sequences and values of the timing information.

In other embodiments, the preset orthogonal sequences include at least one of: [1, 1]; and [1, −1]. In this embodiment, the two values of the preset orthogonal sequences are preferred embodiments, and other values may also be included.

Figure 5:
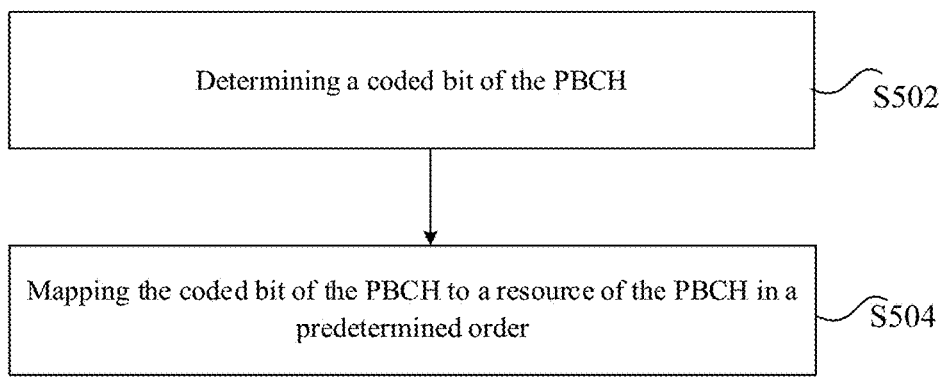
FIG. 5 is a flowchart of a method for mapping a coded bit of a PBCH according to an embodiment of the present invention.

This embodiment provides a method for mapping a coded bit of a PBCH. FIG. 5 is a flowchart of a method for mapping a coded bit of a PBCH according to an embodiment of the present invention. As shown in FIG. 5, the flow includes a step S502 and a step S504.

In step S502, determining a coded bit of the PBCH.

In step S504, mapping the coded bit of the PBCH to a resource of the PBCH in a predetermined order.

Through the above steps, after a base station determines a coded bit of a PBCH, the coded bit of the PBCH is mapped to a resource of the PBCH in a predetermined order to indicate to a terminal implicit timing information according to the coded bit of the mapped PBCH. Therefore, problems of a large terminal overhead and a large capacity requirement existing in the related art could be solved, and effects of cutting down the terminal overhead and reducing the terminal capacity requirement could be achieved.

In other embodiments, an execution body of the above steps may be a base station, but is not limited thereto.

In other embodiments, mapping the coded bit of the PBCH to the resource of the PBCH in the predetermined order includes: mapping the coded bit of the PBCH to the resource of the PBCH corresponding to a synchronization signal bandwidth; and mapping the coded bit of the PBCH to the resource of the PBCH outside a synchronization signal bandwidth.

In other embodiments, mapping the coded bit of the PBCH to the resource of the PBCH in the predetermined order includes: mapping the coded bit of the PBCH to the resource of the PBCH corresponding to a synchronization signal bandwidth of which a time domain location satisfies a first predetermined condition; mapping the coded bit of the PBCH to the resource of the PBCH outside a synchronization signal bandwidth of which a time domain location satisfies a first predetermined condition; mapping the coded bit of the PBCH to the resource of the PBCH corresponding to a synchronization signal bandwidth of which a time domain location satisfies a second predetermined condition; and mapping the coded bit of the PBCH to the resource of the PBCH outside a synchronization signal bandwidth of which a time domain location satisfies a second predetermined condition.

The present invention will be described in detail below with reference to embodiments.

Embodiment One

This embodiment provides a method for transmitting timing information, including the following contents:

carrying at least part of timing information by using a physical broadcast channel (PBCH) demodulation reference signal (DMRS).

The timing information includes at least one of: a serial number of a synchronization signal burst set; a serial number of a synchronization signal burst in an SS burst set; a serial number of a slot in a synchronization signal burst; a serial number of an SS block in a slot; a serial number of an SS block in an SS burst set; a serial number of an SS block in an SS burst; a serial number of a slot in an SS burst set; N least significant bits of an SS block index (N least significant bits of the synchronization signal block index); M most significant bits of an SS block index (M most significant bits of the synchronization signal block index); X middle significant bits of an SS block index (X middle significant bits of synchronization signal block index); part or all of information of a system frame number (SFN); radio frame timing information; and half frame timing information.

The carrying at least part of timing information by using the physical broadcast channel demodulation reference signal includes: indicating the timing information by using at least one of the following features of the DMRS: a DMRS sequence; a mapping manner of the DMRS sequence; and an orthogonal cover code (OCC) used by a DMRS sequence on different PBCH symbols.

Indicating the timing information by using the mapping manner of the DMRS sequence includes defining a plurality of orders of mapping the DMRS sequence to time and frequency domain resources, where different mapping orders indicate different values of the timing information.

Indicating the timing information by using the orthogonal cover code (OCC) used by the DMRS sequence on different PBCH symbols includes defining a plurality of sets of orthogonal cover codes, and processing DMRS sequences on a plurality of PBCH symbols by using the orthogonal cover codes; and indicating different values of the timing information by using the different orthogonal cover codes.

The sequence may be combined with the physical broadcast channel transmission manner to indicate a complete synchronization signal index.

The physical broadcast channel transmission manner includes at least one of: an information bit carried by a physical broadcast channel, a cyclic shift of a physical broadcast channel coded bit, a scrambling code of a physical broadcast channel, and a CRC mask of a physical broadcast channel.

Embodiment Two

This embodiment provides a method for mapping a coded bit of a PBCH, and specifically includes the following contents: mapping a coded bit of a PBCH to a PBCH resource in the following order: first mapping the coded bit of the PBCH to a resource corresponding to a synchronization signal bandwidth in a PBCH symbol; and then mapping the coded bit to a resource outside a synchronization signal bandwidth in a PBCH symbol.

For a mapping manner of a PBCH coded bit, the PBCH coded bit is mapped to a PBCH resource in the following order: a part corresponding to a synchronization signal bandwidth of an earlier PBCH symbol in time domain-> a part outside a synchronization signal bandwidth of an earlier PBCH symbol in time domain-> a part corresponding to a synchronous signal bandwidth of a later PBCH symbol in time domain-> a part outside a synchronization signal bandwidth of a later PBCH symbol in time domain.

Figure 6:
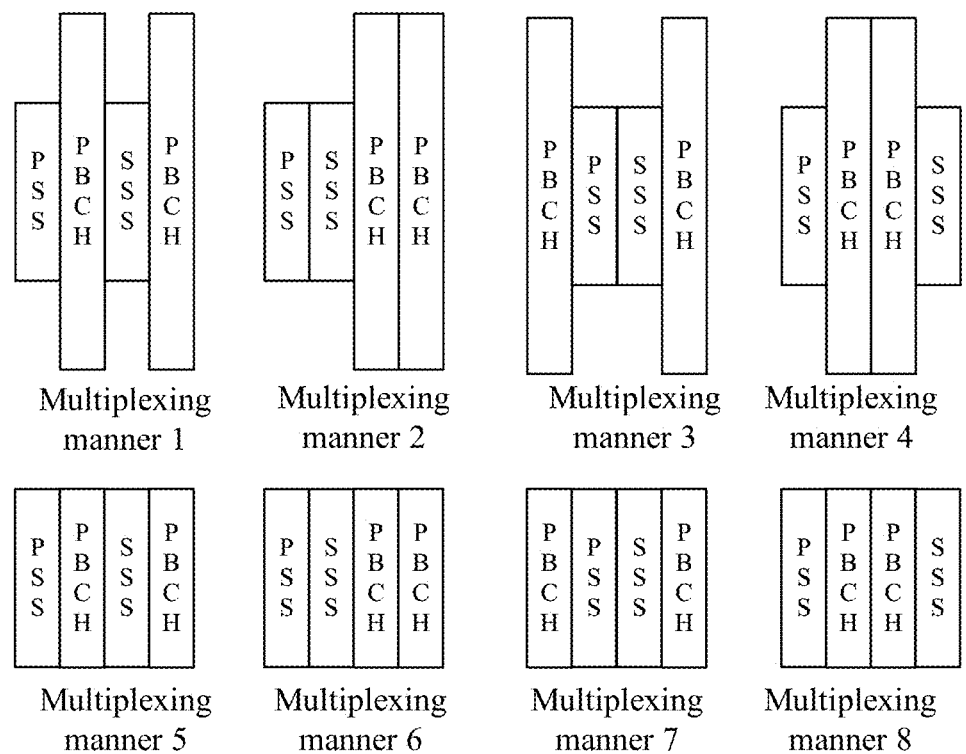
FIG. 6 is a schematic diagram of a multiplexing manner of primary and secondary synchronization signals and a physical broadcast channel according to an embodiment of the present invention.

One SS burst set contains one or more SS bursts, one synchronization signal burst contains one or more synchronization signal blocks (SS blocks), each SS block is used for transmitting information in a specific beam direction, and full coverage of an expected coverage range is completed by a synchronization signal burst set. A primary synchronization signal (PSS), a secondary synchronization signal SSS), and a PBCH are included in each synchronization signal block. A case of carrying other signal channels within an SS block is not excluded. As shown in FIG. 6, possible multiplexing manners of eight primary and secondary synchronization signals and a physical broadcast channel are given. Multiplexing manners 1-4 correspond to cases where synchronization signals and a physical broadcast channel have different bandwidths (typically, a PSS/SSS occupies 144 REs, where REs in which synchronization signal sequence elements are mapped are 127 REs therein, and a PBCH occupies 288 RE). Multiplexing manners 5-8 correspond to cases where synchronization signals and a physical broadcast channel have the same bandwidth (typically, a PSS/SSS/PBCH occupies 144 REs, where REs in which synchronization signal sequence elements are mapped are 127

REs therein). In the following, for a case where synchronization signals and a physical broadcast channel have different bandwidths, multiplexing manner 1 is described as an example; for a case where synchronization signals and a physical broadcast channel have the same bandwidth, multiplexing manner 5 is described as an example; and other multiplexing manners are similar thereto.

Figure 7:
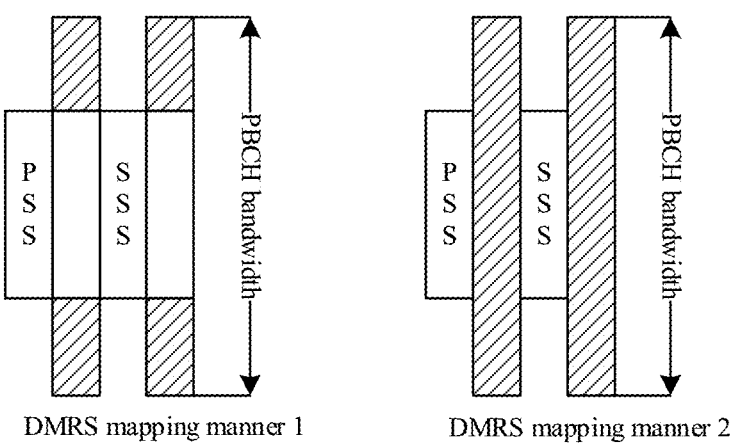
FIG. 7 is a schematic diagram of a multiplexing manner of a synchronization signal and a physical broadcast channel bandwidth according to an embodiment of the present invention.

As shown in FIG. 7, for a case where synchronization signals and a physical broadcast channel have different bandwidths, mapping resources of a DMRS have the following three types:

1. the DMRS is merely mapped to a part of REs in a frequency band other than a bandwidth of a synchronization signal in a symbol of a PBCH;
2. the DMRS is mapped to a part of REs within the entire PBCH bandwidth in a symbol of a PBCH; and
3. in two PBCH symbols, the DMRS is mapped to one PBCH symbol over a full bandwidth, and the DMRS is mapped to another PBCH symbol on a bandwidth other than a bandwidth of a synchronization signal; for example, in a first PBCH symbol, the DMRS is merely mapped to a part of REs in a frequency band other than a bandwidth of a synchronization signal; and in a second PBCH symbol, the DMRS is mapped to a part of REs in the entire PBCH bandwidth.

For DMRS mapping manner 1, a synchronization signal occupies 144 resource elements REs, but resources in which a synchronization signal sequence is actually mapped are 127 REs in the middle, and eight or nine REs are reserved on both sides as guard bands. In this mapping manner, a bandwidth of a mapped PBCH DMRS may overlap with a bandwidth of a synchronization signal due to presence of a guard band. For example, for a case where a PBCH occupies 288 REs, a PBCH DMRS may be mapped at a certain density in each of upper and lower 84 REs. This case is also within this mapping manner. It is also possible to map a PBCH DMRS at a certain density within each of upper and lower 72 REs.

For DMRS mapping manner 2, timing information may be indicated by using a DMRS corresponding to a synchronization signal bandwidth, or timing information may be indicated by using a DMRS over the entire PBCH bandwidth. In this DMRS mapping manner, a frequency domain density of the DMRS may be different in a synchronization signal bandwidth and outside a synchronization signal bandwidth. In addition, the synchronization signal occupies 144 resource elements REs, but resources in which synchronization signal sequences are actually mapped are 127 REs in the middle, and 8 or 9 REs are reserved on both sides as guard bands. In this mapping manner, a synchronization signal is used for channel estimation before DMRS detection. Due to presence of a guard band, in order to ensure the reliability of synchronization signal channel estimation for PBCH DMRS detection, a bandwidth of the mapped PBCH DMRS may be smaller than the synchronization signal bandwidth. For example, for a case where a PBCH occupies 288 REs, a PBCH DMRS may be mapped at a certain density in the middle 132 REs (the 132 REs are completely covered by the synchronization signal bandwidth). This case is also within this mapping manner. It is also possible to map the PBCH DMRS at a certain density within the middle 144 REs.

For DMRS mapping manner 3, a DMRS mapped outside a synchronization signal bandwidth of a first PBCH symbol uses a fixed sequence, which functions as channel estimation (without carrying timing information); a DMRS mapped to a full bandwidth of a second PBCH symbol is used to indicate an SBI. A DMRS and an SSS on the first PBCH symbol may be used for channel estimation, and used for coherently detecting the DMRS on the second PBCH symbol to improve detection performance of the DMRS, thereby improving performance of timing information indication. Similarly, due to presence of a synchronization signal guard band, the DMRS mapped outside the bandwidth of the synchronization signal of the first PBCH symbol may be a PBCH DMRS mapped at a certain density in each of upper and lower 84 REs, or may be a PBCH DMRS mapped at a certain density in each of upper and lower 72 REs.

For a case where a synchronization signal and a physical broadcast channel have the same bandwidth, a DMRS is mapped to a part of REs within the entire PBCH bandwidth in a symbol of the PBCH.

In addition, a PBCH contains a plurality of symbols, and is typically configured as two PBCH symbols shown in FIG. 6. A DMRS sequence may be defined as a long sequence that is mapped to a designated RE across a plurality of PBCH symbols; or a DMRS sequence is independently mapped to each PBCH symbol.

Embodiment Three

This embodiment describes indicating at least part of timing information by using a PBCH DMRS sequence. In a structure shown in FIG. 8, PBCH TTI=80 ms, including four SS burst sets with a period of 20 ms, each SS burst set contains 64 SS blocks, which are respectively mapped in the first 32 slots of the SS burst set, two SS blocks are mapped in each slot, where first three symbols of a slot are reserved for transmitting downlink control or mini-slots, and last three symbols are reserved for use as a guard period GP, and for transmitting uplink control.

Figure 8:
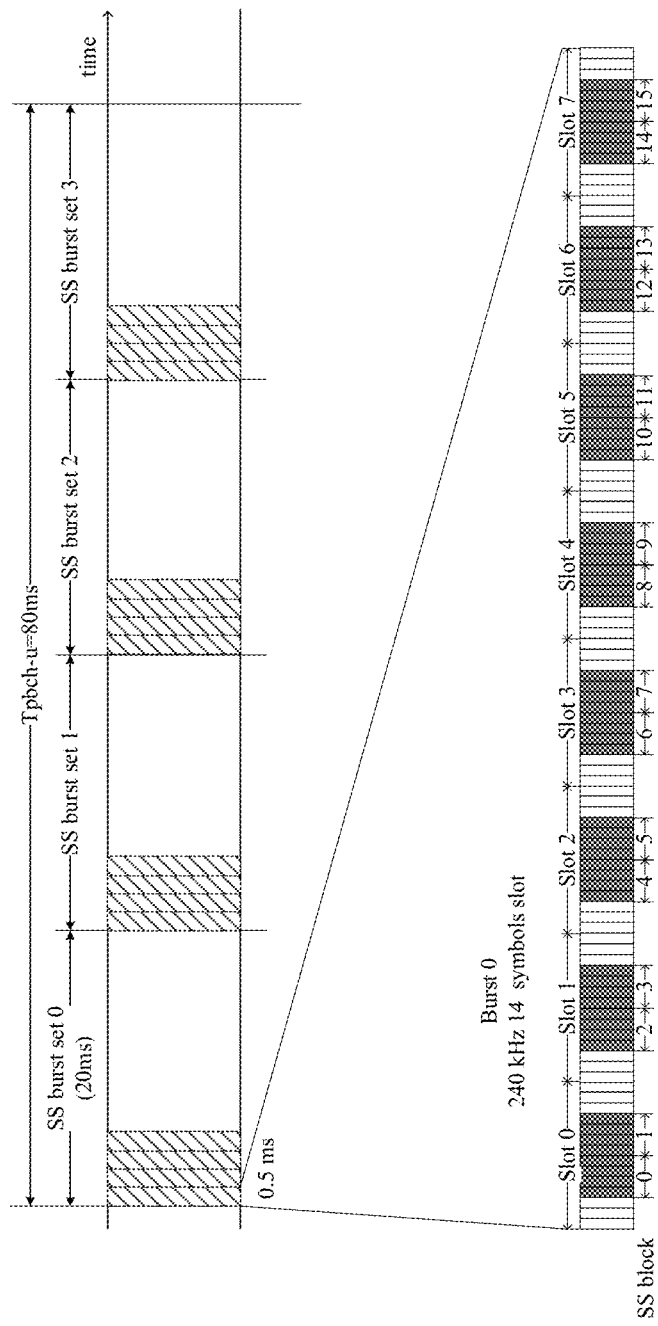
FIG. 8 is a schematic structural diagram of a physical broadcast channel according to an embodiment of the present invention.

In FIG. 8, "a 240 kHz 14 symbols slot" is taken as an example. A manner of mapping an SS block to a data transmission slot and the number of SS blocks included in an SS burst set are only examples. Other structures and the number of SS blocks are not excluded. For different frequency bands, the number of SS blocks, a subcarrier spacing of a signal channel in an SS block, and a mapping structure of a slot time domain may also be different. In addition, these 64 resources are potential transmission resources of an SS block. In an actual system, a base station may choose to carry the SS block on some or all of the resources. When some resources do not actually transmit the SS block, the corresponding index will also be reserved, which will not affect indexes of other SS blocks, that is, an SS block index and a time domain location corresponding to the index are fixed.

The solution considers how a base station indicates to a terminal the 64 SS block indexes {SS block indexes 0-63}.

Figure 9:
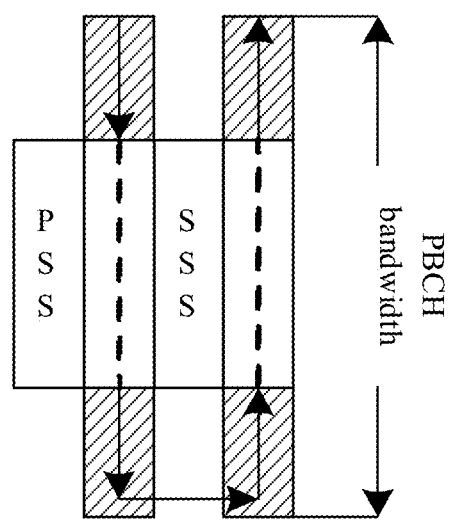
FIG. 9 is a schematic diagram of mapping a PBCH DMRS sequence on two PBCH symbols according to an embodiment of the present invention.

In this embodiment, as shown in FIG. 9, one PBCH DMRS sequence is mapped to two PBCH symbols, and the order of mapping is fixed. As shown by arrows in FIG. 9, the DMRS on the two symbols is mapped to a fixed frequency domain resource (that is, a fixed RE) (a frequency domain resource of the DMRS may be a predefined frequency domain resource, or a frequency domain resource related to a cell ID, for example, three groups of DMRS frequency domain resources are predefined, the cell ID is modeled as 3, which will result in 0 or 1 or 2, corresponding to a group of DMRS resources, respectively), and a length of a DMRS sequence, that is, an inserted time-frequency domain interval, needs to satisfy a PBCH demodulation performance requirement, and different timing information is indicated here only by different sequences.

For example, a PBCH bandwidth is 288 REs, and a bandwidth corresponding to a synchronization signal is 144 REs; a DMRS is only inserted to a PBCH RE outside a synchronization signal bandwidth, and a frequency domain density is ⅓; and therefore, two PBCH symbols have 2*(288−144)/3=96 REs. That is, a length of a DMRS sequence is 96. In the structure shown in FIG. 8, there are 64 different SS blocks in the SS burst set. Therefore, 64 different DMRS sequences (such as sequence 0 to sequence 63) need to be defined to indicate different SS block indexes (in this embodiment, the timing information indicated by using the DMRS sequence is an SS block index). According to a certain generation manner, 64 different sequences with a length of 96 are obtained (for example, the DMRS sequence may be a pseudo-random sequence PN sequence (such as an M sequence, etc.), an initial state is first defined, and then different cyclic shifts are performed on an initial sequence to obtain sequences, and other sequence types and other sequence generation methods are not limited). A base station will carry different PBCH DMRS sequences in different SS blocks, and a mapping relationship between a DMRS sequence and an SS block index is predefined. For example, a DMRS sequence 0 (S0) corresponds to an SS block index 0 (SBI 0), and a sequence 1 corresponds to an SS block index 1, and so on, that is, an Sn<=>SBIn rule is satisfied.

A terminal first detects a synchronization signal of a cell, determines a symbol of a PBCH according to a fixed time domain location relationship between the PBCH symbol and a symbol of the synchronization signal, then determines a cell ID by detecting primary and secondary synchronization signals, and obtains a frequency domain resource set of a DMRS corresponding to the cell ID. A correlation detection operation is further performed on a signal received on the fixed DMRS mapping resource by using a local different DMRS sequence, and a local DMRS sequence corresponding to the maximum correlation peak is determined as a DMRS carried in the current SS block, thereby determining a synchronization signal block index.

Embodiment Four

This embodiment describes indicating at least part of timing information by using a mapping order of a PBCH DMRS sequence. In a structure shown in FIG. 8, one PBCH TTI=80 ms, and four SS burst sets of 20 ms period are included. This embodiment indicates different SS burst sets in a PBCH TTI by using different mapping orders of PBCH DMRS sequences.

Figure 10:
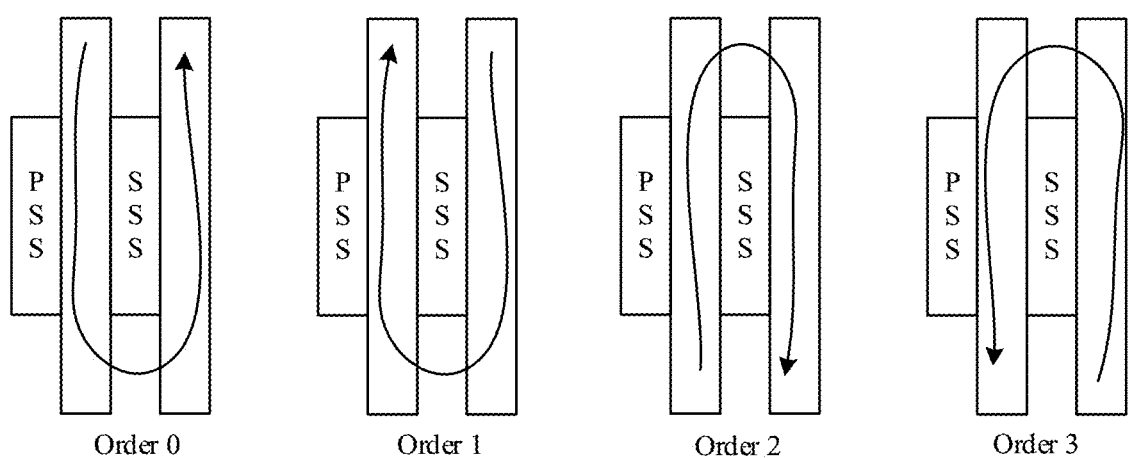
FIG. 10 is a schematic diagram one of a mapping order of a PBCH DMRS sequence according to an embodiment of the present invention.

As shown in FIG. 10, four mapping orders of PBCH DMRS sequences are defined, that is, {order 0, order 1, order 2, order 3} (only four mapping order examples are given here, and other mapping orders are not limited thereto), and correspond to four SS burst sets in the PBCH TTI respectively; for example, order 0 corresponds to a first SS burst set in the PBCH TTI, order 1 corresponds to a second SS burst set in the PBCH TTI, and so on. Further, different 20 ms periods are distinguished. For 10 bits of system frame number (SFN) information, values of the eighth and ninth bits can be determined.

In addition, the first seven bits of the SFN may be explicitly carried by a PBCH. The last bit of the SFN may be determined by detection of an SS block, that is, all the SS blocks in the SS burst set are centrally configured in the 5 ms time window, and a fixed relative location relationship between the time window and the 20 ms period is predefined, for example, all the SS blocks are within first 5 ms of 20 ms, and when a terminal detects a synchronization signal, it indicates that the current time domain resource is first 10 ms of 20 ms, that is, the last 1 bit of the SFN is determined.

A base station will determine a mapping order of a PBCH DMRS in each SS block according to the above mapping relationship in different SS burst sets.

A terminal first detects a synchronization signal of a cell, determines a symbol of a PBCH according to a fixed time domain location relationship between the PBCH symbol and a symbol of the synchronization signal, determines a cell ID by detecting primary and secondary synchronization signals, and obtains a frequency domain resource set of a DMRS corresponding to the cell ID. A correlation detection operation is further performed on a signal received on a fixed DMRS mapping resource by using a local different DMRS mapping order, and a DMRS mapping order corresponding to the maximum correlation peak is determined as a mapping order of a DMRS carried in the current SS block, thereby determining that a current SS block belongs to which SS burst set within a PBCH TTI.

Embodiment 5

Figure 11:
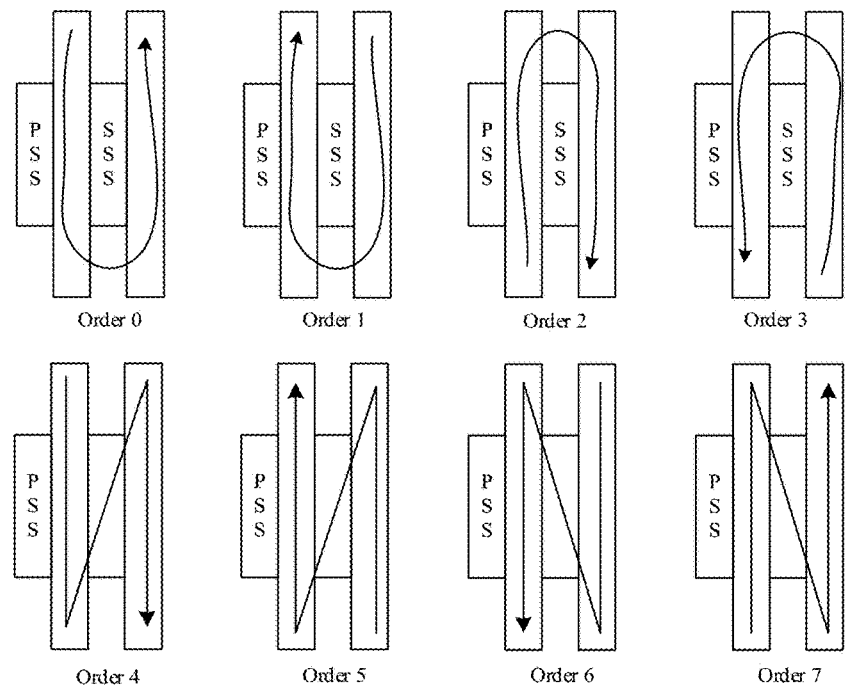
FIG. 11 is a schematic diagram two of a mapping sequence of a PBCH DMRS sequence according to an embodiment of the present invention.

This embodiment describes indicating at least part of timing information by using a PBCH DMRS sequence and a DMRS mapping order collectively. In a structure shown in FIG. 8, one PBCH TTI=80 ms, four SS burst sets of 20 ms period are included, each SS burst set contains 64 different SS blocks, and this embodiment uses different PBCH DMRS sequences and DMRS mapping orders to collectively indicate an SS block index within an SS burst set. As shown in FIG. 11, eight mapping orders of a PBCH DMRS sequence are defined, that is, {order 0, order 1, order 2, order 3, . . . , order 7} (only eight mapping order examples are given here, and other mapping orders are not limited thereto). In order to collectively indicate 64 index information, eight different DMRS sequences (such as sequence 0 to sequence 7) need to be defined. In other embodiments, carrying the timing information by using the DMRS includes: when a number of candidate synchronization signal blocks is 4, defining four different DMRS sequences to be in one-to-one correspondence with four synchronization signal blocks; and when a number of candidate synchronization signal blocks is 8, defining eight different DMRS sequences to be in one-to-one correspondence with eight synchronization signal blocks.

In this embodiment, a DMRS is only inserted to a PBCH RE outside a bandwidth of a synchronization signal, and a frequency domain density is ⅓. Therefore, two PBCH symbols have 2*(288−144)/3=96 REs for inserting the DMRS. That is, the length of a DMRS sequence is 96. According to a certain generation manner, eight different sequences with a length of 96 are obtained (for example, the DMRS sequence may be a pseudo-random sequence PN sequence (such as an M sequence, etc.), an initial state is first defined, and then different cyclic shifts are performed on an initial sequence to obtain other sequences, and other sequence types and other sequence generation methods are not limited). The PBCH DMRS sequences and the DMRS mapping orders collectively indicate SS block indexes, and specific indication relationships are as shown in Table 1.

TABLE 1

| SS block index | PBCH DMRS mapping order | PBCH DMRS sequence |
| --- | --- | --- |
| 0 | Order 0 | Sequence 0 |
| 1 | Order 0 | Sequence 1 |
| 2 | Order 0 | Sequence 2 |
| 3 | Order 0 | Sequence 3 |
| 4 | Order 0 | Sequence 4 |
| 5 | Order 0 | Sequence 5 |
| 6 | Order 0 | Sequence 6 |
| 7 | Order 0 | Sequence 7 |
| 8 | Order 1 | Sequence 0 |
| 9 | Order 1 | Sequence 1 |
| 10 | Order 1 | Sequence 2 |
| ... | ... | ... |
| 62 | Order 7 | Sequence 6 |
| 63 | Order 7 | Sequence 7 |

A base station will determine a PBCH DMRS sequence and a mapping order thereof in the SS block according to an SS block index.

A terminal first detects a synchronization signal of a cell, determines a PBCH symbol according to a fixed time domain location relationship between the PBCH symbol and a symbol of the synchronization signal, determines a cell ID by detecting primary and secondary synchronization signals, and obtains a frequency domain resource set of a DMRS corresponding to the cell ID.

Further, according to assumption on combinations of different DMRS mapping orders and DMRS sequences, a correlation detection operation is performed on a signal received on a fixed DMRS mapping resource, and a DMRS mapping order corresponding to the maximum correlation peak is determined as a mapping order and sequence of a DMRS carried in the current SS block, thereby determining a current SS block index.

Embodiment Six

Figure 12:
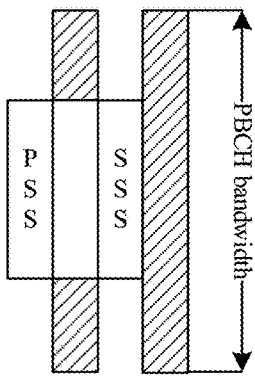
FIG. 12 is a schematic diagram one of a mapping manner of a DMRS on two PBCH symbols according to an embodiment of the present invention.

This embodiment describes another way to carry at least part of timing information by using PBCH DMRS sequences and/or mapping orders. As shown in FIG. 12, a manner of mapping a DMRS on two PBCH symbols is: a DMRS inserted outside a bandwidth of a synchronization signal of a first PBCH symbol uses a fixed sequence, which functions as channel estimation (without carrying timing information); and a DMRS sequence inserted in a full bandwidth of a second PBCH symbol is used to indicate timing information.

In this case, when identifying the DMRS inserted to the second PBCH symbol, the DMRS and an SSS on the first PBCH symbol may be used for channel estimation, that is, a part corresponding to the synchronization signal bandwidth may use the synchronization signal for channel estimation, and a part outside the synchronization signal bandwidth may use the DMRS on the first PBCH symbol for channel estimation. A coherent detection operation is performed on the DMRS on the second PBCH symbol to improve detection performance of the DMRS, thereby improving performance of timing information indication.

A manner in which the DMRS on the second PBCH symbol carries the timing information is: defining a plurality of DMRS sequences.

DMRS is inserted to the second PBCH symbol at a density of ⅓, that is, 96 REs of 288 REs are used to map the DMRS, and eight DMRS sequences with a length of 96 are generated, which are corresponding to different values of the timing information respectively; for example, a SS burst set contains eight SS blocks, and each DMRS sequence corresponds to one SS block index. A correspondence relationship as shown in Table 2 are predefined, and a base station transmits a corresponding DMRS sequence in different SS blocks, and a terminal determines a current SS block index by identifying the DMRS sequence on the second PBCH symbol.

In other embodiments, before identifying the DMRS sequence on the second PBCH symbol, a terminal first uses the synchronization signal and the DMRS on the first PBCH symbol to respectively perform channel estimation for the corresponding frequency band, and uses a channel estimation result, and performs a coherence detection operation on the DMRS on the second PBCH symbols, and the different local sequences are used to correlate with the signals received on the DMRS frequency domain resources, and a sequence with the largest peak is determined as a DMRS sequence transmitted by a current base station. The SS block index corresponding to the sequence is the timing information to be identified.

TABLE 2

| SS block index | DMRS sequence on a second PBCH symbol |
| --- | --- |
| 0 | Sequence 0 |
| 1 | Sequence 1 |
| 2 | Sequence 2 |
| 3 | Sequence 3 |
| 4 | Sequence 4 |
| 5 | Sequence 4 |
| 6 | Sequence 6 |
| 7 | Sequence 7 |

In other embodiments, the mapping order of the DMRS sequence on the second PBCH symbol may be introduced to carry more timing information, and two mapping orders of a DMRS sequence on the second PBCH symbol are predefined: mapping from a high RB number to a low RB number, and mapping from a low RB number to a high RB number. Similar to Embodiment 5, a combination of a sequence and mapping order of a DMRS may carry more timing information. A terminal identifies carried timing information by identifying a sequence and mapping order of a DMRS on a second PBCH symbol.

Embodiment Seven

Figure 13:
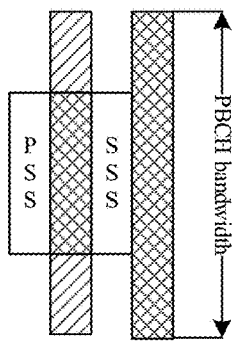
FIG. 13 is a schematic diagram two of a mapping manner of a DMRS on two PBCH symbols according to an embodiment of the present invention.

This embodiment describes another way to carry at least part of timing information by using a PBCH DMRS sequence. As shown in FIG. 13, a manner of mapping a DMRS on two PBCH symbols includes inserting the DMRS into three parts.

The DMRS is inserted to a part of REs outside a bandwidth of a synchronization signal of a first PBCH symbol (a DMRS sequence may be mapped to both sides of the bandwidth of the synchronization signal) (referred to as a first DMRS); the DMRS is inserted to a part of REs of a bandwidth corresponding to a bandwidth of a synchronization signal of a first PBCH symbol (referred to as a second DMRS); and the DMRS is inserted to a part of REs of a full bandwidth of a second PBCH symbol (referred to as a third DMRS).

The first DMRS is a fixed sequence, and the sequence may be a sequence related to a cell identity, that is, different cell IDs may correspond to different sequences, but different synchronization signal blocks of the same cell use the same sequence, and do not carry timing information. The second DMRS and the third DMRS may be configured with a plurality of sequences, and a combination of the two sequences is used to carry timing information. Assuming that a density of a DMRS is ⅓, a length of the first DMRS sequence is 48, a length of the second DMRS sequence is 48, and a length of the third DMRS sequence is 96. In other embodiments, the second DMRS pre-defines four DMRS sequences, and the third DMRS pre-defines 16 DMRS sequences, and a sequence combination of the two include 64 states, which may be used to carry 6 bits of timing information. For example, an SS burst set contains 64 SS blocks, and a DMRS sequence combination may be used to carry an SS block index.

In other embodiments, when identifying the second DMRS, a terminal uses a synchronization signal for channel estimation, and performs coherent detection on the second DMRS, and uses different local sequences of the second DMRS to be correlated with signals received on the second DMRS frequency domain resource, and determines the currently transmitted second DMRS sequence.

When identifying the third DMRS, a terminal uses a synchronization signal and the first DMRS to perform channel estimation respectively, performs a coherent detection operation on the third DMRS by using channel estimation results, and uses different local sequences of the third DMRS to be correlated with signals received on the DMRS frequency domain resource, and determines the obtained sequence with the maximum peak as the third DMRS sequence transmitted by a current base station.

An SS block index corresponding to a combination of two sequences is the timing information to be identified.

Figure 14:
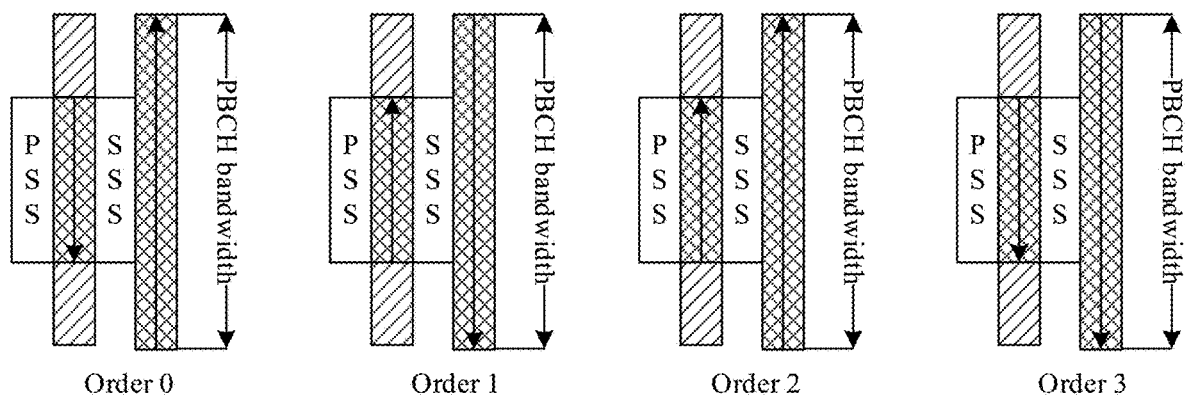
FIG. 14 is a schematic diagram of a DMRS mapping order combination according to an embodiment of the present invention.

In addition, as shown in FIG. 14, the timing information is still indicated by the second DMRS and the third DMRS, and different DMRS mapping order combinations are defined, and the DMRS mapping order combinations may also be used to indicate timing information. In other embodiments, the DMRS sequence combinations and the DMRS mapping order combinations may also indicate timing information collectively.

Embodiment Eight

This embodiment describes another way to carry at least part of timing information by using a PBCH DMRS sequence. As shown in FIG. 13, a manner of mapping a DMRS on two PBCH symbols includes inserting the DMRS into two parts.

The DMRS is inserted to a part of REs outside a bandwidth of a synchronization signal of a first PBCH symbol (a DMRS sequence may be mapped to both sides of the synchronization signal bandwidth) (referred to as a first DMRS); and the DMRS is inserted to both a part of REs of a bandwidth corresponding to a bandwidth of a synchronization signal of a first PBCH symbol, and a part of REs of the full bandwidth of a second PBCH symbol (referred to as a second DMRS).

The first DMRS is a fixed sequence and does not carry timing information. The second DMRS may be configured with a plurality of sequences, and different sequences are used to carry timing information.

Due to presence of a synchronization signal guard band, the first DMRS may be that a PBCH DMRS is mapped at a certain density in each of upper and lower 84 REs, and correspondingly, on a part of REs of a bandwidth corresponding to a bandwidth of the synchronization signal on the first PBCH symbol, specifically mapped to a part of REs of the middle 132 REs; or the first DMRS may be that a PBCH DMRS is mapped at a certain density in each of upper and lower 72 REs, and correspondingly, on a part of REs of a bandwidth corresponding to a bandwidth of the synchronization signal on the first PBCH symbol, and specifically mapped to a part of REs of the middle 144 REs. Both cases are applicable.

Assuming that the density of the DMRS is ⅓, the length of the first DMRS sequence is 48; and the length of the second DMRS sequence is 144.

In other embodiments, the second DMRS is predefined with 16 DMRS sequences and may be used to carry 4 bits of timing information. For example, an SS burst set contains 64 SS blocks, and a DMRS sequence combination may be used to carry an SS block index.

In other embodiments, when a terminal identifies the second DMRS, different parts of the second DMRS sequence utilize different channel estimation results; for example, in the second DMRS, a DMRS mapped to the synchronization signal bandwidth on the first PBCH symbol and the second PBCH symbol uses the synchronization signal for channel estimation; in the second DMRS, a DMRS mapped outside the synchronization signal bandwidth on the second PBCH symbol uses the first DMRS for channel estimation, performs a coherent detection operation on the second DMRS, and determines the sequence used by the second DMRS, thereby determining the value of the timing information.

An SS block index corresponding to a combination of two sequences is the timing information to be identified.

Figure 15:
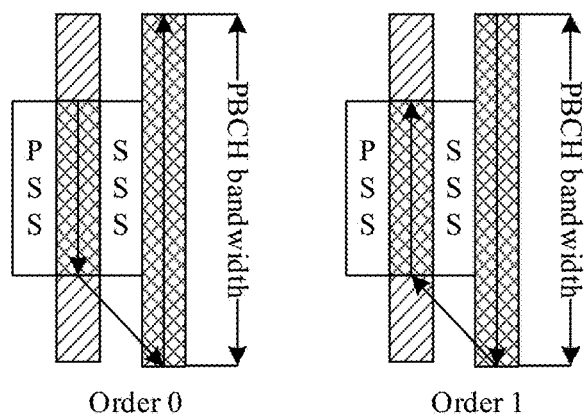
FIG. 15 is a schematic diagram of a second DMRS mapping order according to an embodiment of the present invention.

In addition, as shown in FIG. 15, the timing information is still indicated by the second DMRS, and a different second DMRS mapping order is defined. The second DMRS mapping order may also be used to indicate timing information. In other embodiments, similar to Embodiment 5, the second DMRS sequence and the second DMRS mapping order may also indicate timing information collectively.

Embodiment Nine

This embodiment describes another way to carry at least part of timing information by using a PBCH DMRS sequence and/or a mapping order. As shown in FIG. 9, a manner of mapping a DMRS on two PBCH symbols is: mapping the DMRS on a part of resource elements REs outside a bandwidth of a synchronization signal, and mapping the DMRS outside a bandwidth of a synchronization signal of the first PBCH symbol, using a fixed sequence, which functions as channel estimation (without carrying timing information); and DMRS sequence inserted in a full bandwidth of a second PBCH symbol is used to indicate timing information. The DMRS mapped to the second PBCH symbol defines a plurality of sequences, and different sequences are used to indicate different values of the timing information.

In this case, when the DMRS mapped to the second PBCH symbol is identified, the DMRS on the first PBCH symbol may be used for channel estimation and frequency offset estimation. A coherent detection operation is performed on the DMRS on the second PBCH symbol to improve detection performance of the DMRS, thereby improving performance of timing information indication.

A manner in which the DMRS on the second PBCH symbol carries the timing information is: defining a plurality of DMRS sequences. For example, on the second PBCH symbol, the length of the DMRS sequence is 48, and 16 DMRS sequences with a length of 48 are defined. In addition, a different mapping order of a DMRS on the second PBCH symbol may be defined, and the DMRS mapping order may also be used to indicate timing information. In other embodiments, similar to Embodiment 5, the DMRS sequence and the DMRS mapping order may also indicate timing information collectively.

In addition, two DMRS sequences may be mapped to upper and lower parts of the synchronization signal bandwidth, that is, a DMRS sequence with a length of 24 is defined, and a combination of two sequences is used to indicate timing information.

Figure 16:
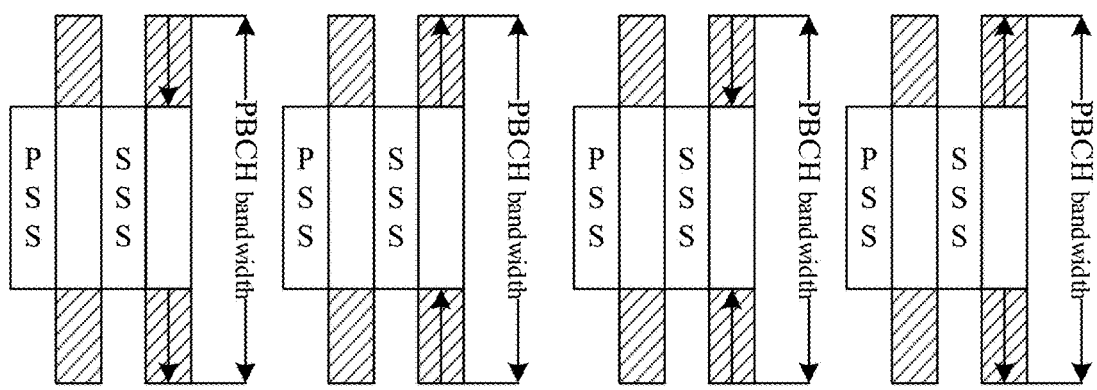
FIG. 16 is a schematic diagram of a second DMRS mapping order combination according to an embodiment of the present invention.

As shown in FIG. 16, a different mapping order combination of a DMRS on the second PBCH symbol may be defined, and the DMRS mapping order combination may also be used to indicate timing information. In other embodiments, similar to Embodiment 5, the DMRS sequence combination and the DMRS mapping order combination may also indicate timing information collectively.

Embodiment Ten

This embodiment describes indicating at least part of timing information by using a PBCH DMRS sequence combination. In a structure shown in FIG. 17, PBCH TTI=80 ms, eight SS burst sets of 10 ms period are included, each SS burst set includes four SS blocks that are mapped in the first two slots of the SS burst set respectively, and two SS blocks are mapped in each of the slots, where first three symbols of the slot are reserved for transmitting downlink control or mini-slots, and last three symbols are reserved for use as a guard period GP, and transmission of uplink control.

Figure 17:
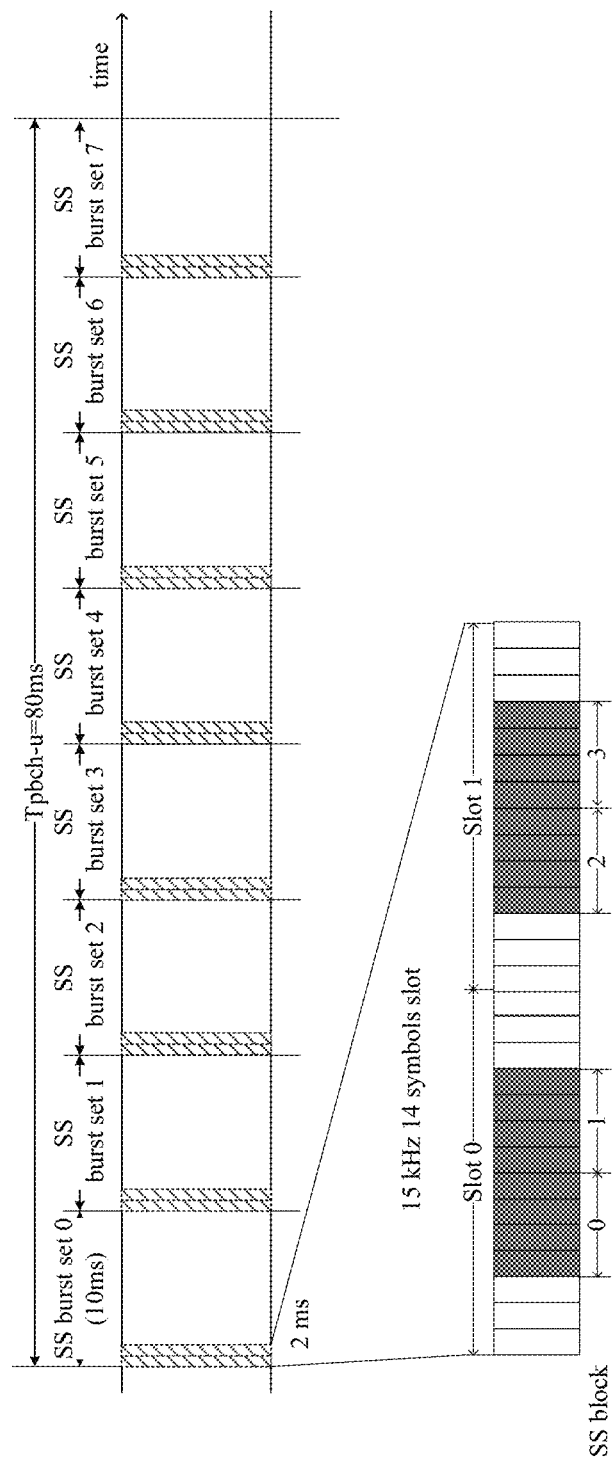
FIG. 17 is a schematic diagram of SS block mapping according to an embodiment of the present invention.

In FIG. 17, "a 15 kHz 14 symbols slot" is taken as an example. A manner of mapping an SS block to a data transmission slot and the number of SS blocks included in an SS burst set are only examples. Other structures and the number of SS blocks are not excluded. For different frequency bands, the number of SS blocks, a subcarrier spacing of a signal channel in an SS block, and a mapping structure of a slot time domain may also be different. In addition, these four resources are potential transmission resources of an SS block. In an actual system, a base station may choose to carry the SS block on some or all of the resources. When some resources do not actually transmit the SS block, the corresponding index will also be reserved, which will not affect indexes of other SS blocks, that is, an SS block index and a time domain location corresponding to the index are fixed.

In the whole PBCH TTI range, a total of 4*8=32 SS blocks are included, and this embodiment considers how a base station indicates to a terminal SS block indexes {SS block indexes 0~3} and radio frame timing information (i.e., the current SS block is in which SS burst set in the PBCH TTI, hereinafter referred to as a serial number of an SS burst set).

Figure 18:
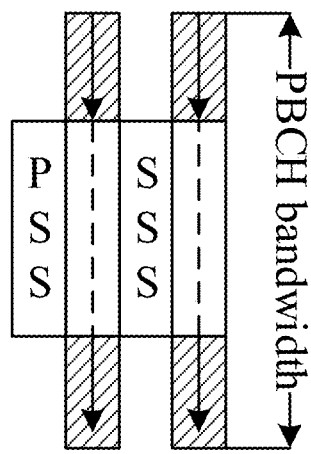
FIG. 18 is a schematic diagram one of mapping a PBCH DMRS sequence to a PBCH symbol according to an embodiment of the present invention.

In this embodiment, as shown in FIG. 18, two PBCH DMRS sequences are respectively mapped to two PBCH symbols, and mapping orders are fixed. As shown by arrows in FIG. 18, a DMRS on each of the PBCH symbols is mapped to a fixed frequency domain resource (that is, a fixed RE) (a frequency domain resource of the DMRS may be a predefined frequency domain resource, or a frequency domain resource related to a cell ID, for example, three groups of DMRS frequency domain resources are predefined, the cell ID is modeled as 3, which will result in 0 or 1 or 2, corresponding to a group of DMRS resources, respectively). Herein, different timing information is indicated only by inserting different sequence combinations of DMRS to two PBCH symbols.

For example, a PBCH bandwidth is 288 REs, and a bandwidth corresponding to a synchronization signal is 144 REs; the DMRS is only inserted to the PBCH RE outside the synchronization signal bandwidth, and a frequency domain density is ⅓; and therefore, two PBCH symbols have (288−144)/3=48 REs. That is, the length of the DMRS sequence inserted to each PBCH symbol is 48.

In the structure shown in FIG. 17, there are 32 combinations of an SS block index and a serial number of an SS burst set. Therefore, it is necessary to define 32 different DMRS sequence combinations. For example, eight DMRS sequences are defined on a first PBCH symbol; and four DMRS sequences are defined on a second PBCH symbol.

Regarding generation of the sequence, taking the DMRS sequence on the first PBCH symbol as an example, eight different sequences with a length of 48 are obtained according to a certain generation method, that is, {Q0, Q1, Q2, Q3, Q4, Q5, Q6, Q7} (for example, the DMRS sequence may be a pseudo-random sequence PN sequence (such as an M sequence, etc.). An initial state is first defined, and then different cyclic shifts are performed on an initial sequence to obtain other sequences, and other sequence types and other sequence generation methods are not limited). Generation of a DMRS sequence on another PBCH symbol is similar, and four different sequences are obtained, that is, {S0, S1, S2, S3}.

A base station will carry different PBCH DMRS sequence combinations in different SS blocks, and a mapping relationship between a DMRS sequence combination and {SS block index, serial number of SS burst set} is predefined, for example, in the manner shown in Table 3, it is equivalent that a DMRS sequence on the first PBCH symbol indicates a serial number of an SS burst set, and a DMRS sequence on the second PBCH symbol indicates an SS block index.

TABLE 3

| Serial number of SS burst set | SS block index | DMRS sequence on a first PBCH symbol | DMRS sequence on a second PBCH symbol |
| --- | --- | --- | --- |
| 0 | 0 | Q0 | S0 |
| 0 | 1 | Q0 | S1 |
| 0 | 2 | Q0 | S2 |
| 0 | 3 | Q0 | S3 |
| 1 | 0 | Q1 | S0 |
| 1 | 1 | Q1 | S1 |
| 1 | 2 | Q1 | S2 |
| 1 | 3 | Q1 | S3 |
| 2 | 0 | Q2 | S0 |
| 2 | 1 | Q2 | S1 |
| 2 | 2 | Q2 | S2 |
| ... | ... | ... | ... |
| 7 | 2 | Q7 | S2 |
| 7 | 3 | Q7 | S3 |

A terminal first detects a synchronization signal of a cell, determines a symbol of a PBCH according to a fixed time domain location relationship between a PBCH symbol and a symbol of a synchronization signal, further correlate different local DMRS sequences {Q0, Q1 Q2, Q3, Q4, Q5, Q6 and Q7} and signals received on a fixed DMRS frequency domain mapping resource on the first PBCH symbol, respectively, and determines a local DMRS sequence corresponding to the maximum correlation peak as a DMRS sequence carried on the first PBCH symbol in the current SS block (for example, Q6); and similarly, the terminal correlates different local DMRS sequences {S0, S1, S2, S3} and signals received on a fixed DMRS frequency domain mapping resource on the second PBCH symbol, respectively, and determines a local DMRS sequence corresponding to the maximum correlation peak as a DMRS sequence carried on the second PBCH symbol in the current SS block (for example, S2). Therefore, the detected SS block belongs to the sixth SS burst set in a PBCH TTI, an SS block index is 2, thereby determining the timing information.

Embodiment Eleven

This embodiment describes indicating at least part of timing information by using a mapping order combination of a PBCH DMRS sequence.

In a structure shown in FIG. 8, one PBCH TTI=80 ms, and four SS burst sets of 20 ms period are included. This embodiment uses different mapping orders of PBCH DMRS sequences to indicate different SS burst sets in the PBCH TTI.

Figure 19:
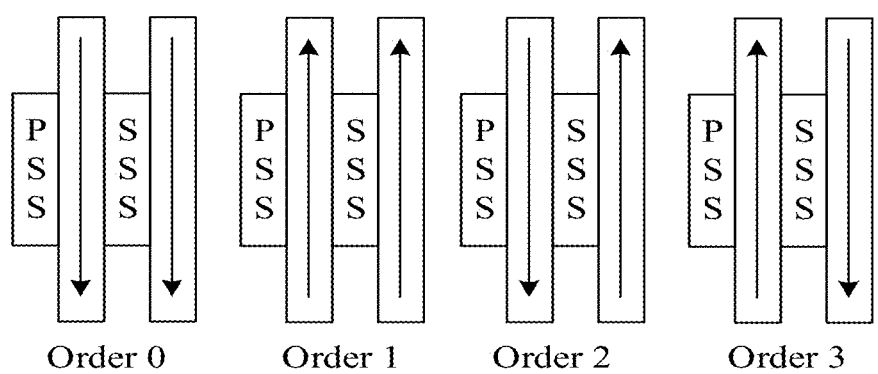
FIG. 19 is a schematic diagram two of mapping a PBCH DMRS sequence to a PBCH symbol according to an embodiment of the present invention.

As shown in FIG. 19, two PBCH DMRS sequences are respectively mapped to two PBCH symbols. As shown by arrows in FIG. 19, four mapping order combinations of PBCH DMRS sequences are defined, that is, {order 0, order 1, order 2, order 3} (here merely four mapping order examples are given, and other mapping sequences are not limited thereto), and correspond to four SS burst sets in a PBCH TTI respectively. For example, order 0 corresponds to a first SS burst set in the PBCH TTI, and order 1 corresponds to a second SS burst set in the PBCH TTI, and so on. Further, different 20 ms periods are distinguished. For 10 bits of system frame number information (SFN), values of the eighth and ninth bits can be determined.

In addition, the first seven bits of the SFN may be explicitly carried by a PBCH. The last bit of the SFN may be determined by the detection of an SS block, that is, all the SS blocks in the SS burst set are centrally configured in the 5 ms time window, and a fixed relative location relationship between the time window and the 20 ms period is pre-defined, for example, the SS block is within the first 5 ms of 20 ms, and when a terminal detects a synchronization signal, it indicates that the current time domain resource is the first 10 ms of 20 ms, that is, the last 1 bit of the SFN is determined.

A base station will determine a mapping order of a DMRS on two PBCH symbols in each SS block according to the above mapping relationship in different SS burst sets.

A terminal first detects a synchronization signal of a cell, and determines a symbol of a PBCH according to a fixed time domain location relationship between a PBCH symbol and a symbol of a synchronization signal, further assumes different DMRS mapping orders, and performs a correlation detection operation on signals received on a fixed DMRS frequency domain mapping resource on the first PBCH symbol by using a local DMRS sequence, and determines a mapping order of a DMRS corresponding to the maximum correlation peak as a mapping order of a DMRS carried on the first PBCH symbol in the current SS block (for example, mapping from a high RB to a low RB), and similarly, assumes different DMRS mapping orders, and performs a correlation detection operation on a signal received on a fixed DMRS frequency domain mapping resource on the second PBCH symbol by using a local DMRS sequence, and determines a mapping order of a DMRS corresponding to the maximum correlation peak as a mapping order of a DMRS carried on the second PBCH symbol in the current SS block (for example, mapping from a low RB to a high RB). That is, mapping orders of the DMRS on two PBCH symbols are combined into order 2, thereby determining that the current SS block belongs to the third SS burst set in the PBCH TTI.

Embodiment Twelve

This embodiment describes indicating at least part of timing information by using an orthogonal sequence on a PBCH DMRS sequence. In a structure shown in FIG. 20, PBCH TTI=80 ms, four SS burst sets with a period of 20 ms are included, each SS burst set includes eight SS blocks that are mapped in the first four slots of the SS burst set respectively, and two SS blocks are mapped in each of the slots, where first three symbols of the slot are reserved for transmitting downlink control or mini-slots, and last three symbols are reserved for use as a guard period GP, and transmission of uplink control.

Figure 20:
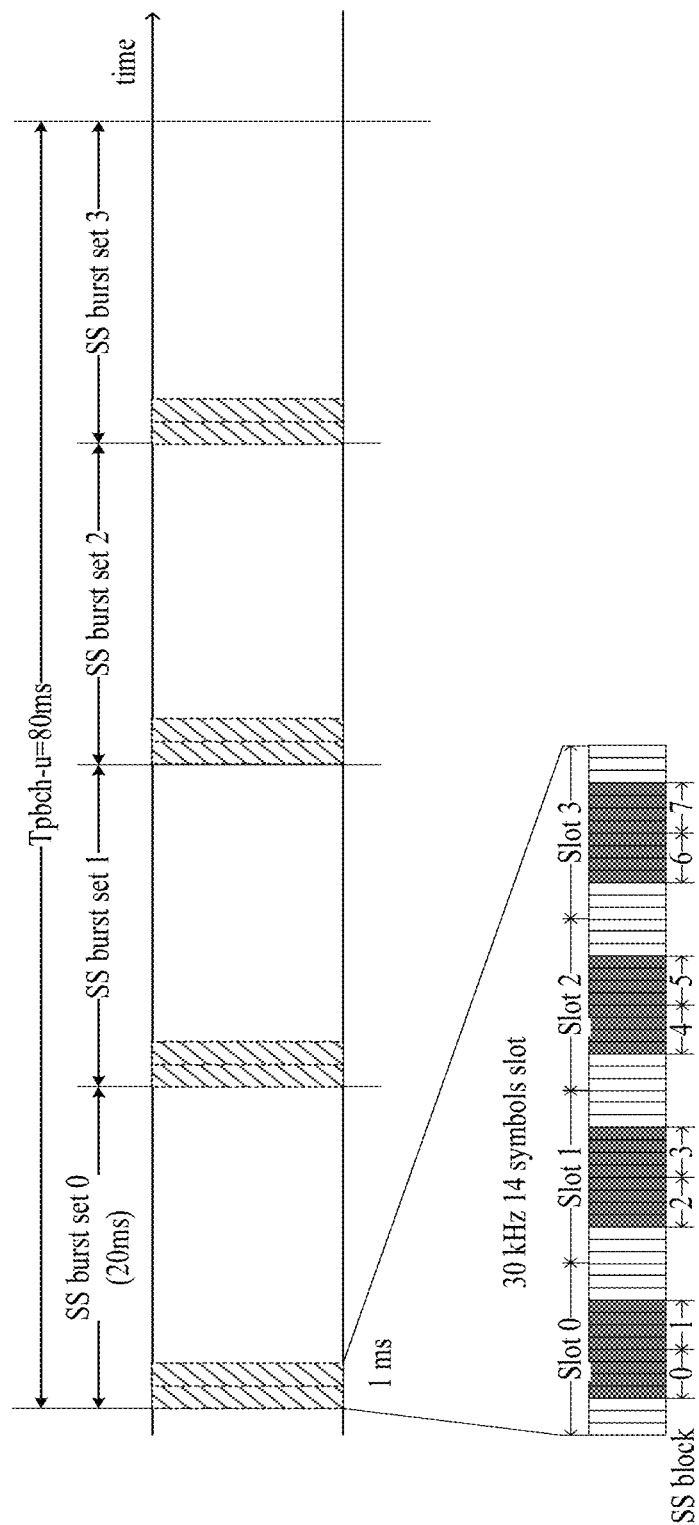
FIG. 20 is a schematic diagram three of mapping a PBCH DMRS sequence to a PBCH symbol according to an embodiment of the present invention.

In FIG. 20, "a 30 kHz 14 symbols slot" is taken as an example. A manner of mapping an SS block to a data transmission slot and the number of SS blocks included in an SS burst set are only examples. Other structures and the number of SS blocks are not excluded. For different frequency bands, the number of SS blocks, a subcarrier spacing of a signal channel in an SS block, and a mapping structure of a slot time domain may also be different. In addition, these eight resources in the SS burst set are potential transmission resources of the SS block. In an actual system, a base station may choose to carry an SS block on some or all of the resources. When some resources do not actually transmit the SS block, the corresponding index will also be reserved, which will not affect indexes of other SS blocks, that is, an SS block index and a time domain location corresponding to the index are fixed.

This embodiment considers how a base station indicates to a terminal the eight SS block indexes {SS block indexes 0~7}.

Figure 21:
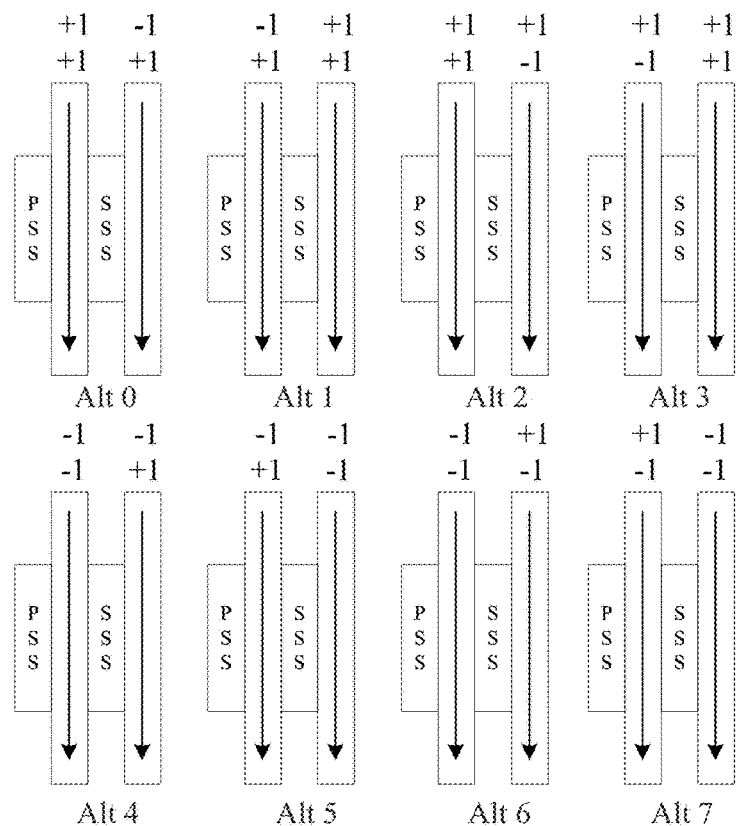
FIG. 21 is a schematic diagram four of mapping a PBCH DMRS sequence to a PBCH symbol according to an embodiment of the present invention.

In this embodiment, as shown in FIG. 21, two PBCH DMRS sequences are respectively mapped to two PBCH symbols, and mapping orders are fixed. As shown by arrows in FIG. 21 (mapping from a high RB to a low RB), a DMRS on each of the PBCH symbols is mapped to a fixed frequency domain resource (that is, a fixed RE) (a frequency domain resource of the DMRS may be a predefined frequency domain resource, or a frequency domain resource related to a cell ID, for example, three groups of DMRS frequency domain resources are predefined, the cell ID is modeled as 3, which will result in 0 or 1 or 2, corresponding to a group of DMRS resources, respectively). And DMRS sequences on the corresponding PBCH symbols in different SS blocks are the same, a DMRS sequence on the first PBCH symbol may be the same as or different from a DMRS sequence on the second PBCH symbol. Here different timing information is indicated by only inserting different orthogonal sequences used by the DMRS to the two PBCH symbols.

For example, a PBCH bandwidth is 288 REs, and a bandwidth corresponding to a synchronization signal is 144 REs; the DMRS is only inserted to the PBCH RE outside the synchronization signal bandwidth, and a frequency domain density is ⅓; and therefore, two PBCH symbols have (288−144)/3=48 REs. That is, the length of the DMRS sequence on each PBCH symbol is 48.

The DMRS sequences on the two symbols are further subjected to orthogonal cover coding, i.e., processed with an orthogonal cover code. Eight orthogonal sequences as shown in FIG. 21 are defined, and mapping relationships between an orthogonal sequence combination and an SS block index as shown in Table 4 are predefined.

TABLE 4

| SS block index | Orthogonal cover code |
|---|---|
| 0 | [+1, −1], [+1, +1] |
| 1 | [−1, +1], [+1, +1] |
| 2 | [+1, +1], [+1, −1] |
| 3 | [+1, +1], [−1, +1] |
| 4 | [−1, −1], [−1, +1] |
| 5 | [−1, −1], [+1, −1] |
| 6 | [−1, +1], [−1, −1] |
| 7 | [+1, −1], [−1, −1] |

For example, on two PBCH symbols, original DMRS sequences inserted respectively are {a0, a1, a2, . . . , a47} and {b0, b1, b2, . . . , b47}. When processing is performed by using orthogonal sequences [+1, −1] and [+1, +1], each element of a DMRS sequence on a first PBCH symbol is multiplied by a first element of one of the orthogonal sequences respectively to obtain a sequence M; each element of a DMRS sequence on a second PBCH symbol is multiplied by a second element of one of the orthogonal sequence respectively to obtain a sequence N, and the corresponding elements of the sequence M and the sequence N are added respectively to obtain {a0-b0, a1-b1, a2-b2, . . . , a47-b47}, and the obtained elements are mapped to DMRS resource elements of the first PBCH symbol respectively; and each element of a DMRS sequence on a second PBCH symbol is multiplied by a first element of the other of the orthogonal sequences respectively to obtain a sequence P, each element of a DMRS sequence on a second PBCH symbol is multiplied by a second element of the other of the orthogonal sequences to obtain a sequence Q, the corresponding elements of the sequence P and the sequence Q are added respectively to obtain {a0+b0, a1+b1, a2+b2, . . . , a47+b47}, and the obtained elements are mapped to DMRS resource elements of the second PBCH symbol respectively. Then, the following DMRS sequences {a0-b0, a1-b1, a2-b2, . . . , . . . , a47-b47} and {a0+b0, a1+b1, a2+b2, . . . , a47+b47} are actually carried on the two PBCH symbols, respectively. In this case, a terminal needs to adopt a specific orthogonal sequence, [+1, +1] and [−1, +1] so that the original DMRS sequence information can be restored. That is, a same original sequence is processed by using a different orthogonal sequence combination in Table 3, different actual transmit DMRS sequences are thus obtained, and when the terminal receives the sequences, the different orthogonal sequence combination is used to perform inverse processing on the received DMRS sequences to restore the original DMRS sequence.

In this process, a terminal determines an orthogonal sequence attached to a current DMRS sequence according to an orthogonal sequence used when an original DMRS sequence is successfully restored, and then determines an SS block index.

Embodiment Thirteen

This embodiment describes another way of indicating at least part of timing information by using an orthogonal sequence on a PBCH DMRS sequence. In a structure shown in FIG. 20, PBCH TTI=80 ms, four SS burst sets with a period of 20 ms are included, each SS burst set includes eight SS blocks that are mapped in first four slots of the SS burst set respectively, and two SS blocks are mapped in each of the slots, where first three symbols of the slot are reserved for transmitting downlink control or mini-slots, and last three symbols are reserved for use as a guard period GP, and transmission of uplink control.

In FIG. 20, "a 30 kHz 14 symbols slot" is taken as an example. A manner of mapping an SS block to a data transmission slot and the number of SS blocks included in an SS burst set are only examples. Other structures and the number of SS blocks are not excluded. For different frequency bands, the number of SS blocks, a subcarrier spacing of a signal channel in an SS block, and a mapping structure of a slot time domain may also be different. In addition, these eight resources in the SS burst set are potential transmission resources of an SS block. In an actual system, a base station may choose to carry the SS block on some or all of the resources. When some resources do not actually transmit the SS block, the corresponding index will also be reserved, which will not affect indexes of other SS blocks, that is, an SS block index and a time domain location corresponding to the index are fixed.

This embodiment describes how a base station indicates to a terminal whether the detected SS block is a first SS block or a last SS block in a slot.

Figure 22:
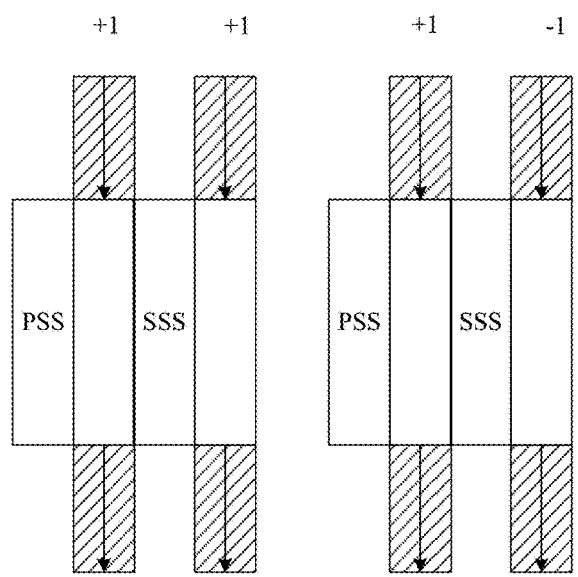
FIG. 22 is a schematic diagram five of mapping a PBCH DMRS sequence to a PBCH symbol according to an embodiment of the present invention.

In this embodiment, as shown in FIG. 22, two PBCH DMRS sequences are respectively mapped to two PBCH symbols, and mapping orders are fixed. As shown by arrows in FIG. 22 (mapping from a high RB to a low RB), a DMRS on each of the PBCH symbols is mapped to a fixed frequency domain resource (that is, a fixed RE) (a frequency domain resource of the DMRS may be a predefined frequency domain resource, or a frequency domain resource related to a cell ID, for example, three groups of DMRS frequency domain resources are predefined, the cell ID is modeled as 3, which will result in 0 or 1 or 2, corresponding to a group of DMRS resources, respectively). And DMRS sequences on the corresponding PBCH symbols in different SS blocks are the same, a DMRS sequence on the first PBCH symbol may be the same as or different from a DMRS sequence on the second PBCH symbol. Here different timing information is indicated by only inserting different orthogonal sequences used by the DMRS on the two PBCH symbols.

In other embodiments, a set of orthogonal sequences, [+1, +1] and [+1, −1], is defined. As shown in FIG. 13, an orthogonal sequence [+1, +1] is used on a first SS block of each slot, that is, multiplying respective elements of a DMRS sequence on a first PBCH symbol by a first element of the orthogonal sequence, and mapping the multiplying results to DMRS resource elements of the first PBCH symbol respectively; and multiplying respective elements of a DMRS sequence on a second PBCH symbol by a second element of the orthogonal sequence, and mapping the multiplying results to DMRS resource elements of the second PBCH symbol respectively. For example, each element of original DMRS sequences on the two PBCH symbols, {a0, a1, a2, . . . , a47} and {b0, b1, b2, . . . , b47}, is multiplied by +1 respectively; on a last SS block of each slot, an orthogonal sequence [+1, −1] is used for processing, that is, each element of the original DMRS sequence on the first PBCH symbol, {a0, a1, a2, . . . , a47}, is multiplied by +1, and each element of the original DMRS sequence on the last PBCH symbol, {b0, b1, b2, . . . , b47}, is multiplied by −1 to obtain {−b0, −b1, −b2, . . . , −b47}.

In this case, a terminal determines whether a current SS block is a first SS block or a last SS block in a slot by determining an orthogonal sequence used in the current SS block.

In other embodiments, the terminal connects data received in a DMRS frequency domain location within the two PBCH symbols in the order indicated by the arrow (the first symbol is mapped from an RE with a high number to an RE with a low number), and performs correlation computation on received sequences by using the following local sequences respectively, {a0, a1, a2, . . . , a47, b0, b1, b2, . . . , b47} and {a0, a1, a2, . . . , a47, −b0, −b1, −b2, . . . , −b47} to obtain two correlation values R1 and R2. If R1>R2, an orthogonal sequence used by a transmitting end is [+1, +1], otherwise an orthogonal sequence used by the transmitting end is [+1, −1].

For example, when an orthogonal sequence used by a transmitting DMRS is [+1, +1], and a local sequence {a0, a1, a2, . . . , a47, b0, b1, b2, . . . , b47} is used to correlate with received data, a larger correlation peak R1 will be obtained; and when a local sequence {a0, a1, a2, . . . , a47, −b0, −b1, −b2, . . . , −b47} is used to correlate with received data, a smaller correlation peak R2 will be obtained. Therefore, R1>R2, and an orthogonal sequence used by the PBCH DMRS sequence in the current SS block is [+1, +1]. Further, the current SS block is determined as the first SS block in the slot.

Embodiment Fourteen

This embodiment describes another way to indicate at least part of timing information by using an orthogonal sequence combination on a PBCH DMRS sequence. In a structure shown in FIG. 20, PBCH TTI=80 ms, four SS burst sets with a period of 20 ms are included, each SS burst set includes eight SS blocks that are mapped in the first four slots of the SS burst set respectively, and two SS blocks are mapped in each of the slots, where first three symbols of the slot are reserved for transmitting downlink control or mini-slots, and last three symbols are reserved for use as a guard period GP, and transmission of uplink control.

This embodiment describes how a base station indicates to a terminal four slots {Slot 0-3} in an SS burst set.

Figure 23:
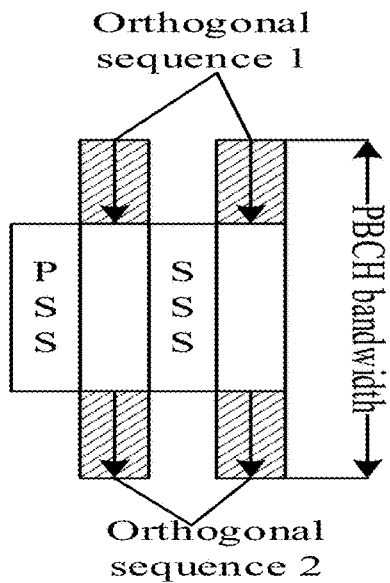
FIG. 23 is a schematic diagram of a DMRS sequence using different orthogonal sequences according to an embodiment of the present invention.

In this embodiment, as shown in FIG. 23, difference from Embodiment 8 is that DMRS sequences of different frequency domain parts adopt different orthogonal sequences. Typically, an upper half of the DMRS sequences uses an orthogonal sequence 1, and a lower half of the DMRS sequences uses an orthogonal sequence 2. A combination of the two indicates timing information collectively. Two orthogonal sequences are defined, and a combination of the upper and lower orthogonal sequences includes 2*2=4 states for indicating 4 slots.

In other embodiments, a mapping relationship between an orthogonal sequence and a serial number of a slot as shown in Table 5 may also be predefined.

TABLE 5

| Serial number of slot in SS burst set | Orthogonal sequence 1 | Orthogonal sequence |
|---|---|---|
| 0 | [+1, +1] | [+1, +1] |
| 1 | [+1, +1] | [+1, −1] |
| 2 | [+1, −1] | [+1, +1] |
| 3 | [+1, −1] | [+1, −1] |

When a terminal performs reception, DMRSs of upper and lower half of frequency domain parts are respectively processed by using different orthogonal sequences in the same manner as described in Embodiment 11, so as to restore an original DMRS sequence. A combination of orthogonal sequences used is identified, and further, an SS block index is determined.

Embodiment Fifteen

This embodiment describes indicating at least part of timing information by using a mapping order of a PBCH DMRS sequence and a combination of orthogonal sequences on the PBCH DMRS sequence. In a structure shown in FIG. 20, PBCH TTI=80 ms, four SS burst sets with a period of 20 ms are included, each SS burst set includes eight SS blocks that are mapped in first four slots of the SS burst set respectively, and two SS blocks are mapped in each of the slots, where first three symbols of the slot are reserved for transmitting downlink control or mini-slots, and last three symbols are reserved for use as a guard period GP, and transmission of uplink control.

On the basis of indicating the SS block index by using the orthogonal cover code on the PBCH DMRS sequence in Embodiment 12, this embodiment further indicates a serial number of an SS burst set by using mapping orders of different PBCH DMRS sequences. As shown in FIG. 19, four mapping order combinations of PBCH DMRS sequences are defined, that is, {order 0, order 1, order 2, order 3} (only four mapping order examples are given here, and other mapping orders are not limited thereto), and correspond to four SS burst sets in the PBCH TTI respectively; for example, order 0 corresponds to a first SS burst set in the PBCH TTI, order 1 corresponds to a second SS burst set in the PBCH TTI, and so on.

A base station will adopt the corresponding DMRS mapping order in a different SS burst set, and process the DMRS by using the corresponding orthogonal sequence for a different SS block.

When a terminal performs DMRS detection, different DMRS mapping sequences are assumed, and under certain DMRS mapping order assumptions, different orthogonal sequences are used for despreading, and an original sequence of a DMRS is correlated with a despreaded signal of the received signal. When the terminal uses an orthogonal sequence to obtain the largest correlation peak in a certain DMRS mapping order, a mapping order of a DMRS in a current SS block and an orthogonal sequence used are determined, thereby determining a serial number of an SS burst set and an SS block index that the current SS block belongs to.

In this embodiment, timing information is collectively indicated by a DMRS mapping order and an additional orthogonal sequence, and the method of the present invention is also applicable to other manners of collective indication. For example, a collective indication of timing information is performed by using any combination of a DMRS mapping order, an orthogonal sequence, and a DMRS sequence.

Embodiment Sixteen

This embodiment describes a method in which a PBCH DMRS sequence is mapped over the entire PBCH bandwidth and a part of the DMRSs corresponding to a synchronization signal bandwidth is used to indicate timing information. When the PBCH DMRS is mapped over the entire PBCH bandwidth, for the part of DMRSs overlapping with a synchronization signal, since the synchronization signal and the PBCH use the same antenna port, the synchronization signal may be used for channel estimation, frequency offset estimation and compensation, which is more advantageous for utilizing coherent detection of the part of DMRSs to improve detection performance.

Figure 24:
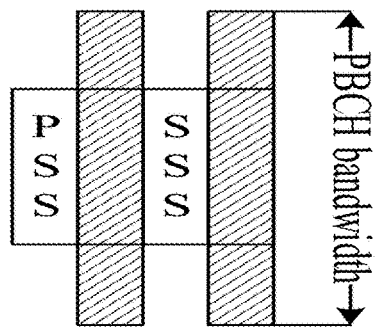
FIG. 24 is a schematic diagram one of synchronization signal sequence mapping according to an embodiment of the present invention.

As shown in FIG. 24, the synchronization signal occupies a bandwidth of 144 RE, where the synchronization signal sequence is mapped to the middle of 127 REs, and each has eight or nine REs as guard bands. The PBCH DMRS may be inserted in the bandwidth corresponding to 127 REs, so that channel estimation and frequency offset estimation and compensation may be performed by using synchronization signals (PSS/SSS). It is also possible to insert a PBCH DMRS in the bandwidth corresponding to 144 REs. Although this is slightly different from the synchronization signal, the channel estimation and frequency offset estimation for an edge DMRS RE are not accurate, but are also acceptable. Here the PBCH DMRS is inserted with 144 REs and the DMRS inserted in the bandwidth range is used to indicate the timing information. DMRS is inserted at a frequency domain density of ⅓, and thus there are 144/3=48 REs on each symbol for DMRS mapping. Similar to the previous embodiments, DMRS sequences may be independently mapped to two symbols, or one DMRS sequence may be commonly mapped thereon.

Figure 25:
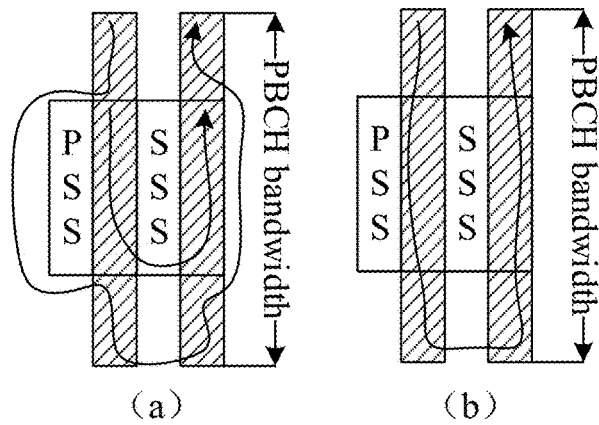
FIG. 25 is a schematic diagram two of synchronization signal sequence mapping according to an embodiment of the present invention.

A DMRS sequence mapped in a bandwidth corresponding to a synchronization signal bandwidth and a DMRS sequence outside the synchronization signal bandwidth may be independent sequences. As shown in the left (a) of FIG. 25, a DMRS sequence is commonly mapped to two PBCH symbols in a bandwidth corresponding to the synchronization signal, and a DMRS sequence are commonly mapped to two PBCH symbols outside the synchronization signal bandwidth. It is also possible to map a DMRS sequence within the PBCH bandwidth.

The method described in the above embodiments is still applicable. That is, at least part of timing information may be indicated by using a DMRS sequence, a DMRS mapping order, an orthogonal sequence, an orthogonal sequence combination, and a combination of the above. When detecting a DMRS, a terminal completes detection of a synchronization signal, uses synchronization signals to perform channel estimation, frequency offset estimation and compensation, and further performs a correlation operation with the DMRS, thereby determining a DMRS sequence, a mapping order, an orthogonal sequence used, and the like of the corresponding part of the synchronization signal bandwidth in a current PBCH symbol. Specific methods are the same as the previous embodiments, and the timing information corresponding thereto is thus obtained.

Embodiment Seventeen

This embodiment describes a method in which a PBCH DMRS sequence is mapped to the entire PBCH bandwidth and timing information is indicated by using a DMRS over the entire PBCH bandwidth.

In this embodiment, the PBCH DMRS is mapped to the entire PBCH bandwidth, and the DMRS on the entire PBCH bandwidth is used to indicate timing information. In this case, the DMRS sequence length is longer, and more information may be implied; however, since only a part of the bandwidth overlaps with the synchronization signal, using the synchronization signal for channel estimation, frequency offset estimation, and coherent detection for DMRS does not necessarily bring about a gain in detection performance. Of course, the method does not limit whether a terminal uses a synchronization signal for channel estimation, frequency offset estimation and compensation.

Figure 26:
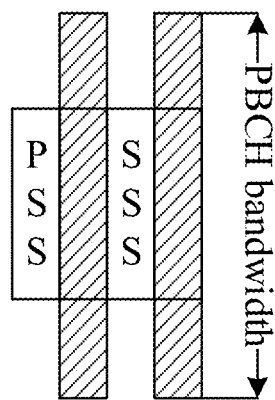
FIG. 26 is a schematic diagram of DMRS mapping according to an embodiment of the present invention.

As shown in FIG. 26, a PBCH occupies a bandwidth of 288 REs, and a DMRS is inserted at a frequency domain density of ⅓, and 288/3=96 REs are used for DMRS mapping on each symbol. Similar to the previous embodiments, DMRS sequences may be independently mapped to two symbols, or one DMRS sequence may be commonly mapped thereon.

The method described in Embodiments 3-10 is still applicable. That is, at least part of timing information may be indicated by using a DMRS sequence, a DMRS mapping order, an orthogonal sequence, an orthogonal sequence combination, and any combination of the above.

When detecting a DMRS, a terminal completes detection of a synchronization signal, optionally, the synchronization signal may be used for channel estimation, frequency offset estimation and compensation (that is, a channel estimation result of the synchronization signal is applied to a part of DMRS corresponding to the bandwidth of the synchronization signal, and a coherent detection operation is performed on this part of the DMRS; and the channel estimation result of the synchronization signal is not applied to the DMRS outside the synchronization signal bandwidth, and a non-coherent detection operation is performed on the part of the DMRS); the channel estimation and the frequency offset estimation and compensation may not be performed at all, and the non-coherent detection operation is performed on the DMRS so as to determine a DMRS sequence, a mapping order, an orthogonal sequence used, and the like in a current PBCH symbol, and the specific manner is the same as the foregoing embodiment, thereby obtaining timing information corresponding thereto.

Embodiment Eighteen

In this embodiment, timing information is indicated by using a PBCH DMRS sequence and a physical broadcast channel transmission manner collectively. The physical broadcast channel transmission manner includes at least one of: information bits carried by a physical broadcast channel, a cyclic shift of physical broadcast channel information bits, a scrambling code of a physical broadcast channel, a CRC mask of a physical broadcast channel, and a redundancy version (RV) of a physical broadcast channel.

For example, in a structure as shown in FIG. 8, the timing information includes: 10 bits of SFN information, 1 bit of half frame timing, and 6 bits of SS block index information. Since a PBCH TTI is 80 ms, that is, PBCH information content is unchanged within 80 ms, high 7 bits of an SFN may be explicitly carried in a payload of the PBCH. The 8th and 9th bits of the SFN (equivalent to distinguishing different SS burst sets in the PBCH TTI) need to achieve timing of a 20 ms level, and an SS burst set may be distinguished by different RVs. For the last 1 bit, since an SS block is centrally configured in a first 5 ms of 20 ms, a terminal mainly detects the SS block, which means that the current SS block is in a first 10 ms of 20 ms (that is, a first radio frame within 20 ms), and located in a first half of the radio frame. SS block index information may be carried by using different DMRS sequences in the manner of Embodiment 1.

The foregoing is merely a typical example of indicating timing information by using a PBCH DMRS sequence and a physical broadcast channel transmission manner. The PBCH DMRS sequence and the physical broadcast channel transmission manner may be combined in any manner to indicate complete timing information.

Embodiment Nineteen

Figure 26A:
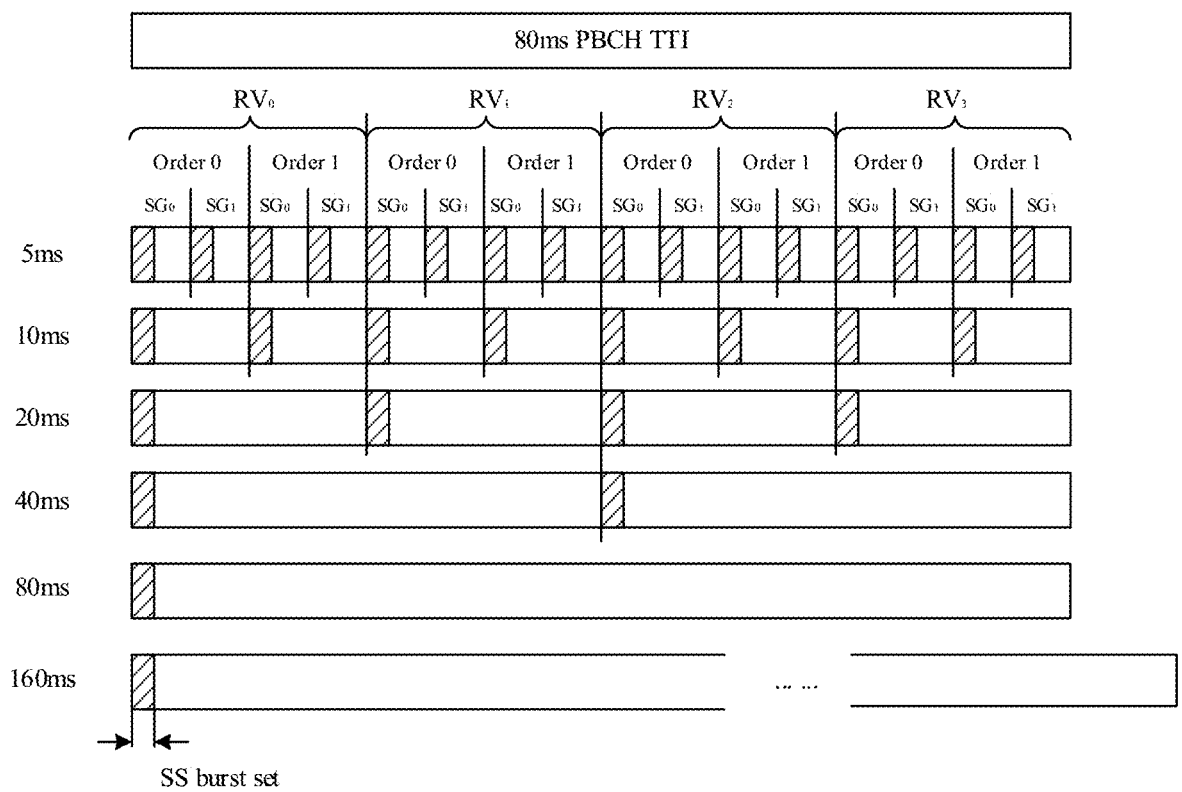
FIG. 26A is a schematic diagram one of a method for indicating timing information according to an embodiment of the present invention.

In this embodiment, a method for indicating complete timing information is described, which specifically includes the following contents: a synchronization signal burst set has the following six period configurations, including: 5 ms, 10 ms, 20 ms, 40 ms, 80 ms and 160 ms. In different period configurations, requirements for the number of indication bits are different. As shown in FIG. 26a, in a 5 ms period configuration, a terminal needs to distinguish 16 potential locations within a 80 ms PBCH TTI, that is, 4 bits indication information is required. For higher period configuration, fewer indication bits are required. When a terminal in an initial access phase does not know the actual synchronous transmission period on a network side, the same timing indication information should correspond to the same time domain location regardless of the transmission period, in order to avoid timing ambiguity of the terminal. As shown in FIG. 26A, combinations of different PBCH RVs (0 to 4), PBCH DMRS mapping orders (order 0, order 1), and PBCH DMRS sequence groups (Sequence group 0, Sequence group 1) correspond to different timing indication information for indicating the lower three bits of a system frame number and half frame timing. For the case of a large period, a part of the combinations will not be used. For example, in the case of a period of 40 ms, merely the following two combinations are used: {RV 0, Order 0, SG 0} and {RV 2, Order 0, SG 0}.

In addition, for different frequency ranges, the number of SS blocks included in an SS burst set is also different. For a frequency band below 3 GHz, the SS burst set contains up to four SS blocks; in a frequency band of 3 GHz to 6 GHz, an SS burst set contains up to eight SS blocks; and in a frequency band of 6 GHz to 52.6 GHz, an SS burst set contains up to 64 SS blocks. Therefore, the number of SS block indexes in an SS burst set is also different, and the number of required indication bits is also different.

In this embodiment, assuming that for a frequency band below 6 GHz and a frequency band above 6 GHz, 5 bits of information may be carried through an attribute of a DMRS. For example, in the mapping manner shown in FIG. 26B, a DMRS is inserted to a part of REs outside a synchronization signal bandwidth of a first PBCH symbol (a DMRS sequence may be mapped to both sides of the synchronization signal bandwidth) (referred to as a first DMRS); and a DMRS is commonly mapped to both a part of REs of a bandwidth corresponding to a synchronization signal bandwidth of a first PBCH symbol, and a part of REs of the full bandwidth of the second PBCH symbol (referred to as a second DMRS).

The first DMRS is a fixed sequence, and the sequence may be a sequence related to a cell identity, that is, different cell IDs may correspond to different sequences, but the same sequence is used in different synchronization signal blocks of the same cell, and does not carry timing information. The second DMRS may configure a plurality of sequences (such as 32) and introduce different mapping orders (two mapping orders shown by arrows in FIG. 26b).

Timing information includes: a 10 bits of SFN, half frame timing, and a 6 bits of SS block index. Indication is given by using the following manners:

The high 7 bits of the SFN are used to be explicitly carried in PBCH information bits.

As shown in FIG. 26a, four PBCH RVs are defined for indicating 20 ms timing (corresponding to the 8th and 9th bits of the SFN), that is, RV 0 corresponds to a first 20 ms in the PBCH TTI, RV 1 corresponds to a second 20 ms in the PBCH TTI, RV 2 corresponds to a third 20 ms in the PBCH TTI, and RV 3 corresponds to a fourth 20 ms in the PBCH TTI. The radio frame timing (equivalent to the lowest bit of the SFN) is indicated by two PBCH DMRS mapping orders, for example, order 0 corresponds to a first radio frame within each 20 ms, and order 2 corresponds to a last radio frame within each 20 ms.

32 PBCH DMRS sequences are divided into two groups, each group contains 16 sequences, and a sequence group (SG) to which the currently mapped sequence belongs is used to indicate first and second half frames in a radio frame.

Figure 26B:
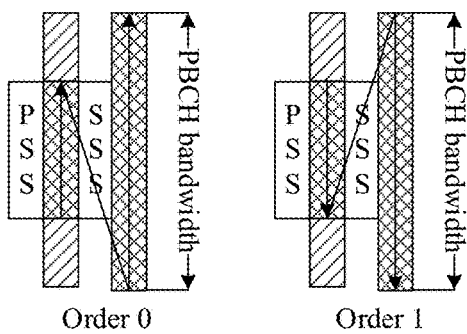
FIG. 26B is a schematic diagram two of a method for indicating timing information according to an embodiment of the present invention.
Figure 26C:
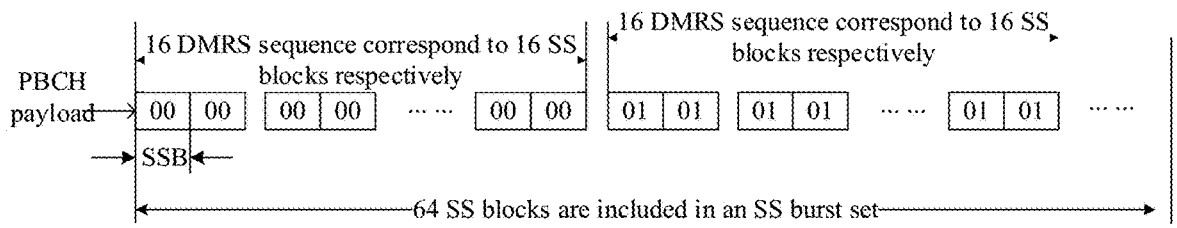
FIG. 26C is a schematic diagram three of a method for indicating timing information according to an embodiment of the present invention.

In other embodiments, for a frequency band below 6 GHz, 16 sequences are sufficient to indicate eight SS block indexes. Therefore, for a frequency band below 3 GHz, an SS burst set contains up to four SS blocks, and four different DMRS sequences are defined to be in one-to-one correspondence with the four SS blocks; for a frequency band of 3 GHz to 6 GHz, an SS burst set contains up to eight SS blocks, and eight different DMRS sequences are defined to be in one-to-one correspondence with the eight SS blocks; and for a frequency band above 6 GHz, 16 sequences are not sufficient to indicate 64 different SS block indexes. As shown in FIG. 26c, in PBCH information bits, 2 bits of explicit information are introduced, which are 00, 01, 10 and 11, respectively.

In this case, for a frequency band below 6 GHz, information bits for indicating an SS block index may not be introduced in the PBCH information bits, and a terminal determines the number of PBCH information bits according to a frequency band range to which an access frequency point belongs. It is also possible to consider to preserve the two bits at the low frequency from the perspective of uniform design, and configure them with the same value (for example, 00, these two bits have no real-time meaning), or two bits corresponding to the low frequency are used to indicate other information, thus maintaining the number of PBCH information bits in high and low frequencies to be the same.

Embodiment Twenty

In this embodiment, another indication method of complete timing information is described. In this embodiment, assumption is made as follows: for a frequency band below 6 GHz and a frequency band above 6 GHz, 3 bits of information may be carried through an attribute of a DMRS, for example, presetting eight DMRS sequences for carrying.

Timing information includes: a 10 bits of SFN, half frame timing, and a 6 bits of SS block index. Indication is given by using the following manners:

7 high bits of the SFN are used to be explicitly carried in PBCH information bits.

Figure 26D:
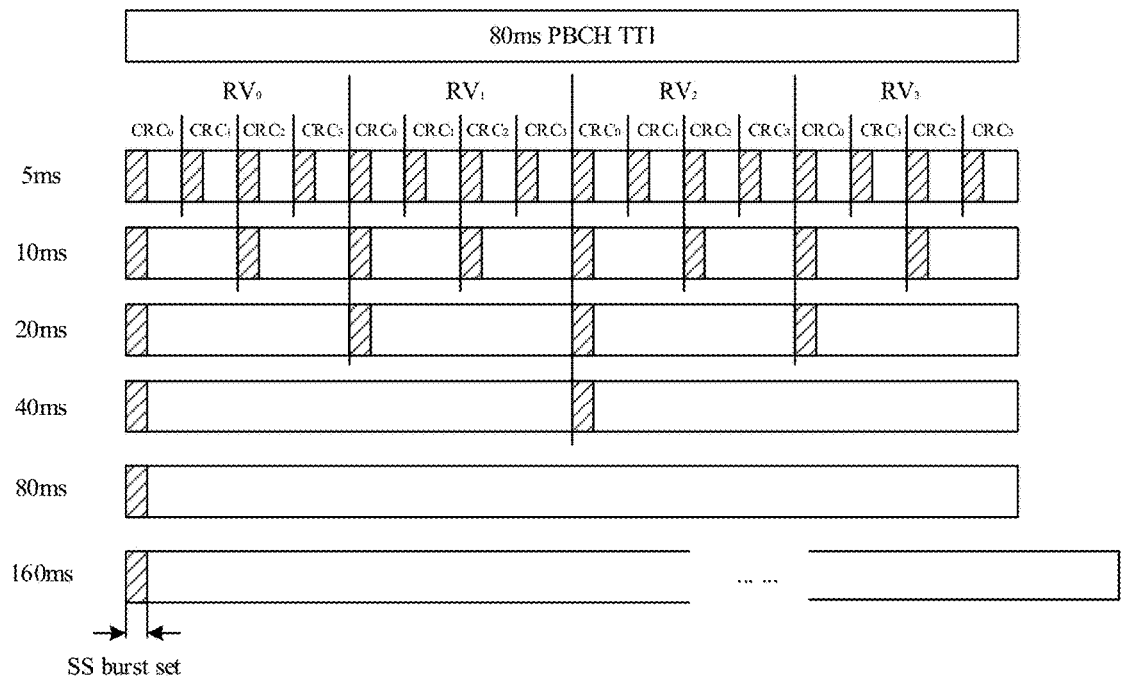
FIG. 26D is a schematic diagram four of a method for indicating timing information according to an embodiment of the present invention.

As shown in FIG. 26d, four PBCH RVs are defined for indicating 20 ms timing (corresponding to the 8th and 9th bits of the SFN), that is, RV 0 corresponds to a first 20 ms in a PBCH TTI, RV 1 corresponds to a second 20 ms in the PBCH TTI, RV 2 corresponds to a third 20 ms in the PBCH TTI, and RV 3 corresponds to a fourth 20 ms in the PBCH TTI. Different 5 ms (equivalent to radio frame timing and half frame timing) within each 20 ms is indicated by a CRC mask of a PBCH. That is, CRC mask 0 corresponds to a first 5 ms, CRC mask 1 corresponds to a second 5 ms in 20 ms, CRC mask 2 corresponds to a third 5 ms in 20 ms, and CRC mask 3 corresponds to a fourth 5 ms in 20 ms.

Similarly, it is necessary to ensure that a combination of RV\CRC uniquely corresponds to a time domain location to avoid terminal timing ambiguity problems. That is, for the 5 ms of period, different combinations of RV and CRC will be used; and for a larger period, some combinations will not be used. For example, in a 40 ms of period, merely two combinations such as RV0\CRC0 and RV2\CRC0 are applied.

Figure 26E:
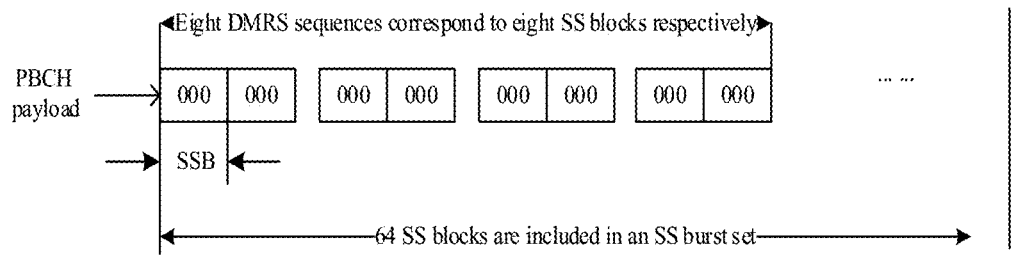
FIG. 26E is a schematic diagram five of a method for indicating timing information according to an embodiment of the present invention.

In other embodiments, carrying the timing information by using the DMRS includes: dividing all defined DMRS sequences into two sequence groups, and a sequence group to which the DMRS sequence belongs being used to indicate first and second half frames in a radio frame. For a frequency band below 6 GHz, eight sequences are sufficient to indicate eight SS block indexes. Therefore, for a frequency band below 3 GHz, an SS burst set contains up to four SS blocks, and four different DMRS sequences are defined to be in one-to-one correspondence with the four SS blocks; for a frequency band of 3 GHz to 6 GHz, an SS burst set contains up to eight SS blocks, and eight different DMRS sequences are defined to be in one-to-one correspondence with the eight SS blocks; and for a frequency band above 6 GHz, eight sequences are not sufficient to indicate 64 different SS block indexes. As shown in FIG. 26e, in PBCH information bits, 3 bits of explicit information are introduced, which are 000, 001, 010, 011, 100, 101, 110 and 111, respectively. The 3 bits of explicit information is used to indicate three most significant bits of an SS block index. Therefore, a plurality of adjacent SS blocks will contain the same PBCH information bits, facilitating combined reception.

In this case, for a frequency band below 6 GHz, information bits for indicating an SS block index may not be introduced in the PBCH information bits, and a terminal determines the number of PBCH information bits according to a frequency band range to which an access frequency point belongs. It is also possible to consider to preserve the three bits at the low frequency from the perspective of uniform design, and configure them with the same value (for example, 000, these three bits have no practical meaning), or three bits corresponding to the low frequency are used to indicate other information, thus maintaining the number of PBCH information bits in high and low frequencies to be the same.

Embodiment Twenty-One

In this embodiment, another indication method of complete timing information is described. In this embodiment, it is assumed that for a frequency band below 6 GHz, 7 bits of information may be carried by an attribute of a DMRS, for example, being commonly carried by preset 64 DMRS sequences and mapping orders of two DMRS sequences; and for a frequency band of 6 GHz or higher, 8 bits of information may be carried by an attribute of a DMRS, for example, being commonly carried by preset 128 DMRS sequences and mapping orders of two DMRS sequences.

Figure 26F:
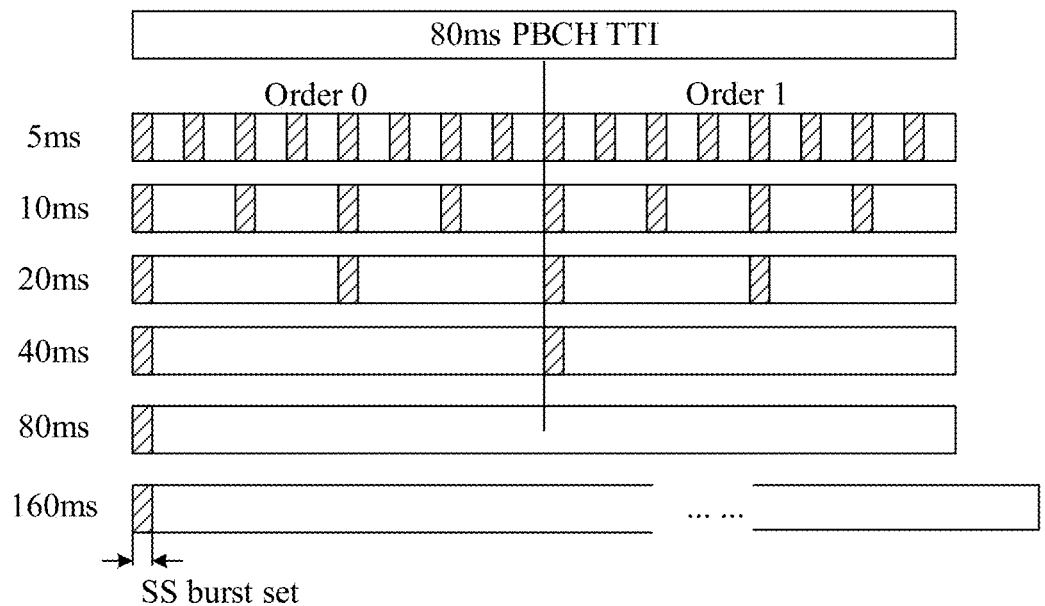
FIG. 26F is a schematic diagram six of a method for indicating timing information according to an embodiment of the present invention.

Timing information includes: a 10 bits of SFN, half frame timing, and a 6 bits of SS block index. Indication is given by using the following manners:

7 high bits of the SFN are used to be explicitly carried in PBCH information bits. As shown in FIG. 26f, two PBCH DMRS mapping orders (Order 0, Order 1) as shown in FIG. 26b are defined, which are used to indicate 40 ms timing, that is, first and second 40 ms in 80 ms PBCH TTI are distinguished (corresponding to the 8th bit of the SFN). That is, Order 0 corresponds to a first 40 ms in the PBCH TTI, and Order 1 corresponds to a second 40 ms in the PBCH TTI.

For a frequency band below 6 GHz, each SS burst set contains up to 8 SS blocks, and then contains up to 8 SS burst sets in 40 ms (corresponding to the case of a 5 ms of period), and therefore there are up to 64 SS blocks in 40 ms. 64 sequences (sequence 0 to sequence 63) included in a DMRS are in one-to-one correspondence with 64 SS blocks in 40 ms. When the period is greater than 5 ms, only a part of DMRS sequences will be used. For example, for a 20 ms period, only two SS burst sets are included in 20 ms, only 16 DMRS sequences are needed, and serial numbers are {sequence 0 to sequence 7, sequence 32 to 39}. Other periods include sequence indexes of the corresponding serial numbers, that is, a correspondence relationship between a sequence and a time domain location is ensured to be uniform under different periods.

For a frequency band above 6 GHz, each SS burst set contains up to 64 SS blocks, and up to 8 SS burst sets are contained in 40 ms. 128 sequences included in a DMRS are not sufficient to be divided into two groups {sequence 0 to sequence 63} and {sequence 64 to sequence 127} for indicating 20 ms timing, that is, using a sequence group {sequence 0 to sequence 63} for a first 20 ms within each 40 ms, each sequence corresponding to an SS block index within an SS burst set; and using a sequence group {sequence 64 to sequence 127} for a second 20 ms within each 40 ms, each sequence corresponding to an SS block index within an SS burst set (burst set).

Different 5 ms within 40 ms are carried by an attribute of a PBCH, for example, defining eight different scrambling bits of PBCH coded bits to correspond to different 5 ms within 40 ms respectively. Alternatively, 3 bits of timing information is carried in a payload of the PBCH for indicating locations of eight different 5 ms.

In this case, for a frequency band below 6 GHz, bits for indicating timing information may not be introduced in the PBCH information bits, and a terminal determines the number of PBCH information bits according to a frequency band range to which an access frequency point belongs. It is also possible to consider to preserve the three bits at the low frequency from the perspective of uniform design, and configure them with the same value (for example, 000, these three bits have no real-time meaning), or three bits corresponding to the low frequency are used to indicate other information, thus maintaining the number of PBCH information bits in high and low frequencies to be the same.

Embodiment Twenty-Two

In this embodiment, another indication method of complete timing information is described. In this embodiment, it is assumed that for a frequency band below 6 GHz, 5 bits of information may be carried by an attribute of a DMRS, for example, being commonly carried by preset 16 DMRS sequences and mapping orders of two DMRS sequences; and for a frequency band of 6 GHz or higher, 8 bits of information may be carried by an attribute of a DMRS, for example, being commonly carried by preset 128 DMRS sequences and mapping orders of two DMRS sequences.

Timing information includes: a 10 bits of SFN, half frame timing, and a 6 bits of SS block index. Indication is given by using the following manners:

7 high bits of the SFN are used to be explicitly carried in PBCH information bits.

Figure 26G:
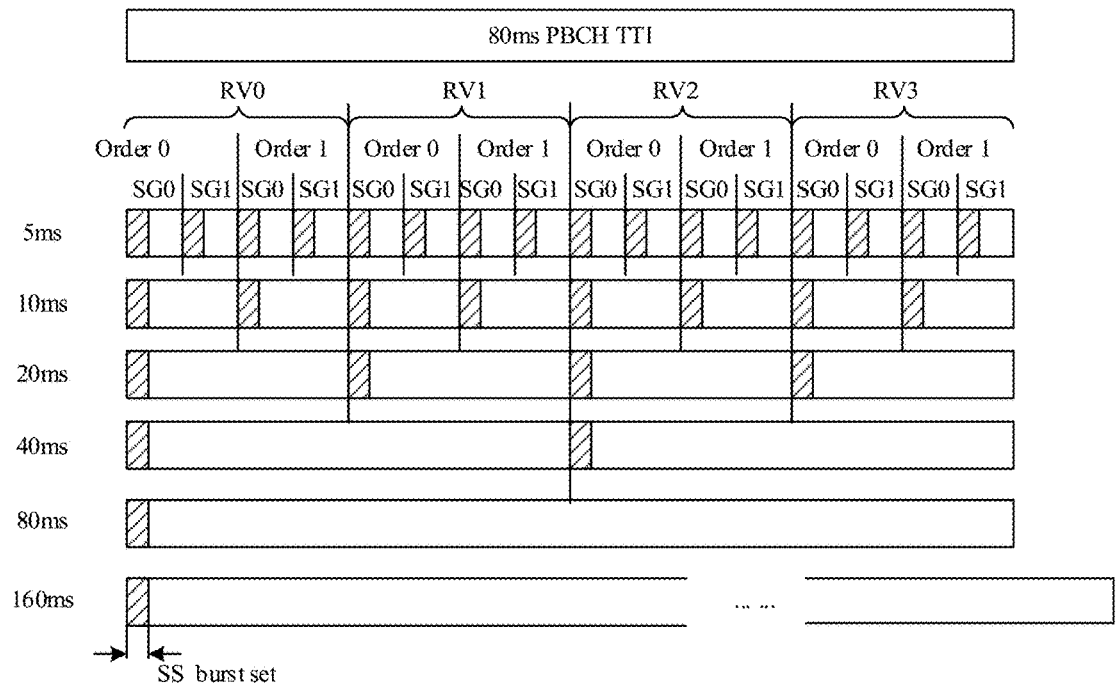
FIG. 26G is a schematic diagram seven of a method for indicating timing information according to an embodiment of the present invention.

As shown in FIG. 26g, four PBCH RVs are defined for indicating 20 ms timing (corresponding to the 8th and 9th bits of the SFN), that is, RV 0 corresponds to a first 20 ms in the PBCH TTI, RV 1 corresponds to a second 20 ms in the PBCH TTI, RV 2 corresponds to a third 20 ms in the PBCH TTI, and RV 3 corresponds to a fourth 20 ms in the PBCH TTI. Radio frame timing, that is, first and second 10 ms within each 20 ms, is indicated by a mapping order of a PBCH. That is, Order 0 corresponds to a first 10 ms within 20 ms, and Order 1 corresponds to a second 10 ms within 20 ms.

In other embodiments, for half frame timing, that is, first and second 5 ms within 10 ms, a sequence is divided into two groups, and a sequence in each sequence group (SG) indicates first and second half frame; for a frequency band below 6 GHz, each SG contains 8 sequences; and for a frequency band above 6 GHz, each SG contains 64 sequences; that is, SG 0 corresponds to a first 5 ms in each radio frame, and SG 1 corresponds to a second 5 ms in each radio frame.

Similarly, it is necessary to ensure that a combination of RV\Order\CRC uniquely corresponds to a time domain location to avoid terminal timing ambiguity problems. That is, for a 5 ms of period, different combinations of RV\Order\SG will be used; and for a larger period, some combinations will not be used. For example, in a 40 ms of period, only two combinations such as RV 0\Order 0\SG 0 and RV 2\Order 0\SG 0 are applied.

In other embodiments, for a frequency band below 6 GHz, eight sequences are sufficient to indicate 8 SS block indexes in an SS block set. Therefore, for a frequency band below 3 GHz, an SS burst set contains up to four SS blocks, and four different DMRS sequences are defined to be in one-to-one correspondence with the four SS blocks; for a frequency band of 3 GHz to 6 GHz, an SS burst set contains up to eight SS blocks, and a correspondence relationship between eight different DMRS sequences and eight SS blocks are preset, and the corresponding DMRS sequences are mapped in a specified mapping order (mapping order) in a specified SS block; and for a frequency band above 6 GHz, 64 sequences are used to indicate 64 SS block indexes, and a correspondence relationship between 64 different DMRS sequences and 64 SS blocks are preset, and the corresponding DMRS sequences are mapped in a specified mapping order in a specified SS block.

Alternatively, instead of grouping the PBCH DMRS sequences, different PBCH DMRS sequences may indicate SS block indexes within a radio frame range. That is, for a frequency band below 6 GHz, 16 different PBCH DMRS sequences correspond to 16 SS blocks respectively in a radio frame (up to two SS burst sets, each SS burst set contains at most eight SS blocks). For a frequency band above 6 GHz, 128 different PBCH DMRS sequences correspond to 128 SS blocks in a radio frame respectively (containing up to two SS burst sets, each of which contains up to 64 SS blocks).

Embodiment Twenty-Three

In this embodiment, a mapping manner of a PBCH coded bit is described.

Figure 27:
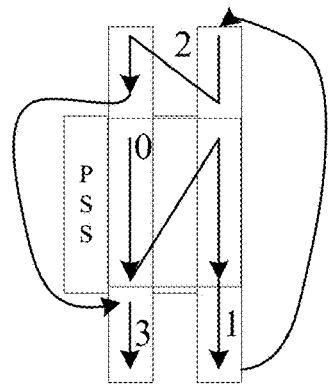
FIG. 27 is a schematic diagram one of mapping a coded bit of a PBCH according to an embodiment of the present invention.

Since a synchronization signal and a PBCH use the same antenna port, the synchronization signal may be used for channel estimation of the PBCH of the corresponding bandwidth, and for the PBCH bandwidth outside the synchronization signal, according to the manner described in the foregoing embodiments of the present invention, since a PBCH DMRS sequence needs to indicate timing information, a terminal needs to perform blind check on a DMRS sequence, or a mapping order, or an orthogonal sequence, which will take a certain amount of time. As shown in FIG. 27, a PBCH coded bit is mapped in an order indicated by arrows shown in FIG. 27, that is, first mapping the coded bit to a resource corresponding to a synchronization signal bandwidth; and then mapping the coded bit to a resource outside a synchronization signal bandwidth. This allows the terminal to start decoding the PBCH coded bit of the part corresponding to the synchronization signal bandwidth after successfully detecting the synchronization signal, and proceed to decode the PBCH coded bit outside the synchronization signal bandwidth after successfully identifying a PBCH DMRS and using the DMRS to complete channel estimation.

On information content, the corresponding resources in the synchronization signal bandwidth may include complete PBCH coded bit, and the PBCH coded bit is repeatedly transmitted on a PBCH resource outside the synchronization signal bandwidth. In this case, the terminal under the condition of high SNR can complete reception of the PBCH by decoding only the PBCH in a part corresponding to the synchronization signal bandwidth. In condition that the decoding cannot be successfully performed, the two parts of the PBCH coded bits inside and outside the synchronization signal bandwidth may be combined and decoded. The two parts of the PBCH coded bits may not be simply repeated, but use different redundancy versions to support the terminal to perform incremental redundancy (IR) combinations on the two parts of the PBCH coded bits.

It is also possible not to repeat transmission, that is, a resource corresponding to a bandwidth of a synchronization signal merely includes a part of the PBCH coded bit, and the complete PBCH coded bit is included on all the PBCH resources.

In addition, in condition that the same PBCH coded bit is transmitted on two symbols, the same PBCH information of the two parts may be used for frequency offset estimation. Therefore, the PBCH may be encoded according to a resource in a bandwidth corresponding to a bandwidth of the synchronization signal of a single PBCH symbol, and repeatedly transmitted on the corresponding bandwidth of a synchronization signal of another PBCH symbol, that is, within the corresponding bandwidth of the synchronization signal of a certain PBCH symbol, complete PBCH coded bit information is included. A terminal under the condition of a high SNR can complete reception of a PBCH by decoding a received signal in the corresponding bandwidth of a synchronization signal of a certain PBCH symbol. At the same time, two repeated PBCH coded bits will enable frequency offset estimation. For a PBCH resource outside the synchronization signal bandwidth, transmission of the PBCH coded bit may be repeated twice at an approximate code rate, or the PBCH coded bit may be repeatedly transmitted at a lower code rate.

Embodiment Twenty-Four

In this embodiment, a mapping manner of a PBCH is described. Since a synchronization signal and a PBCH use the same antenna port, the synchronization signal may be used for channel estimation of the PBCH of the corresponding bandwidth, and for a PBCH bandwidth outside the synchronization signal, according to the manner described in Embodiments 3-9 of the present invention, since a PBCH DMRS sequence needs to indicate timing information, a terminal needs to perform blind check on a DMRS sequence, or a mapping order, or an OCC, which will take a certain amount of time. In addition, the preceding PBCH symbols allow for earlier decoding.

Figure 28:
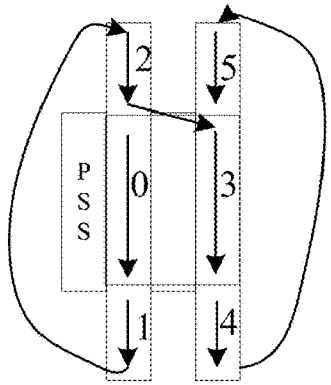
FIG. 28 is a schematic diagram two of mapping a coded bit of a PBCH according to an embodiment of the present invention.

As shown in FIG. 28, the PBCH coded bit is mapped in an order indicated by arrows in FIG. 28, that is, a part corresponding to a synchronization signal bandwidth of a PBCH symbol of which a time domain location is placed at the front->a part outside a synchronization signal bandwidth of a PBCH symbol of which a time domain location is placed at the front->a part corresponding to a synchronous signal bandwidth of a PBCH symbol of which a time domain location is placed at the back->a part outside a synchronization signal bandwidth of a PBCH symbol of which a time domain location is placed at the back.

A resource of a part corresponding to a synchronization signal bandwidth is mapped first, and then a resource of a part outside the synchronization signal bandwidth is mapped. This allows a terminal to start decoding a PBCH coded bit of the part corresponding to the synchronization signal bandwidth after successfully detecting the synchronization signal, and proceed to decode a PBCH coded bit outside the synchronization signal bandwidth after successfully identifying a PBCH DMRS and using the DMRS to complete channel estimation.

On information content, each PBCH symbol may include a complete PBCH coded bit, and the PBCH coded bit is repeatedly transmitted on another PBCH symbol. In this case, a terminal under the condition of a high SNR can complete reception of a PBCH by only decoding a PBCH in a part corresponding to a synchronization signal bandwidth. In condition that the decoding cannot be successfully performed, the two parts of the PBCH coded bits inside and outside the synchronization signal bandwidth may be combined and decoded. The two parts of the PBCH coded bits may not be simply repeated, but use different redundancy versions to support the terminal to perform incremental redundancy (IR) combinations on the two parts of the PBCH coded bits.

Alternatively, the resource corresponding to the synchronization signal bandwidth may include a complete PBCH coded bit, and the PBCH coded bit is repeatedly transmitted on a PBCH resource outside the synchronization signal bandwidth. In this case, a terminal under the condition of a high SNR can decode the PBCH by only decoding the PBCH corresponding to the synchronization signal bandwidth. If the decoding cannot be successfully performed, the two parts of the PBCH coded bits inside and outside the synchronization signal bandwidth may be combined and decoded. The two parts of the PBCH coded bits may not be simply repeated, but use different redundancy versions to support the terminal to perform incremental redundancy combinations on the two parts of the PBCH coded bits.

It is also possible not to repeat transmission, that is, a resource corresponding to a synchronization signal bandwidth only include a part of PBCH coded bit, and the complete PBCH coded bits is included on all the PBCH resources.

In addition, in condition that the same PBCH coded bit is transmitted on two symbols, the same PBCH information of the two parts may be used for frequency offset estimation. Therefore, a PBCH may be encoded according to a resource corresponding to a synchronization signal bandwidth of a single PBCH symbol, and repeatedly transmitted on the corresponding bandwidth of a synchronization signal of another PBCH symbol, that is, within a bandwidth corresponding to a synchronization signal bandwidth of a certain PBCH symbol, complete PBCH coded bit information is included. A terminal under the condition of a high SNR can complete reception of a PBCH by decoding a received signal in the corresponding bandwidth of a synchronization signal of a certain PBCH symbol. At the same time, two repeated PBCH coded bits will enable frequency offset estimation. For a PBCH resource outside a synchronization signal bandwidth, transmission of the PBCH coded bit may be repeated twice at an approximate code rate, or the PBCH coded bit may be repeatedly transmitted at a lower code rate.

In the present application, technical features in the various embodiments may be used in combination in one embodiment without conflict. Each embodiment is merely an optimal embodiment of the present application.

In summary, the present solution provides a method for indicating timing information by using a PBCH DMRS sequence, a mapping order, an OCC, and any combination. Therefore, when complete SS block index information is indicated by using a sequence, decoding of a PBCH in a terminal measurement and reporting process can be avoided; if it is finally determined that the terminal still needs to obtain the index by decoding the PBCH, complexity of the blind detection of the PBCH is also minimized to the greatest extent, and part of the information is considered to be obtained before the PBCH is checked, that is, the part of information is indicated by the sequence. In addition, the method described in the application effectively reduces capacity requirement for a single indication manner.

In addition, the present invention also provides a manner of mapping a coded bit of a PBCH, which could decode the PBCH more quickly, and supports reception of the PBCH by a terminal with small bandwidth capability very well.

From the description of the embodiment of the invention, those skilled in the art would clearly understand that the invention can be achieved by software together with the necessary general-purpose hardware according to the methods in the above embodiments, and certainly can also be achieved only by hardware, but the former would be preferred. Based on this understanding, the technical solution of the present invention naturally or the portion by which the invention contributes to the prior art can be implemented in the form of software products, and the software products can be stored in storage media (such as an ROM/RAM, a magnetic disk, or an optical disc) containing several instructions capable of enabling a computer device (which may be a personal computer, a server or a network device, etc.) to execute the methods described in each of the embodiments of the present invention.

The embodiment further provides an apparatus for transmitting timing information, and the apparatus is configured to implement the foregoing embodiment and preferable implementation manners, and what has been illustrated will not repeated redundantly. As used hereinafter, the term "module" may implement a combination of software and/or hardware with a predetermined function. Although the apparatus described in the following embodiment is preferably implemented by software, the implementation of hardware or a combination of software and hardware is also possible and conceivable.

Figure 29:
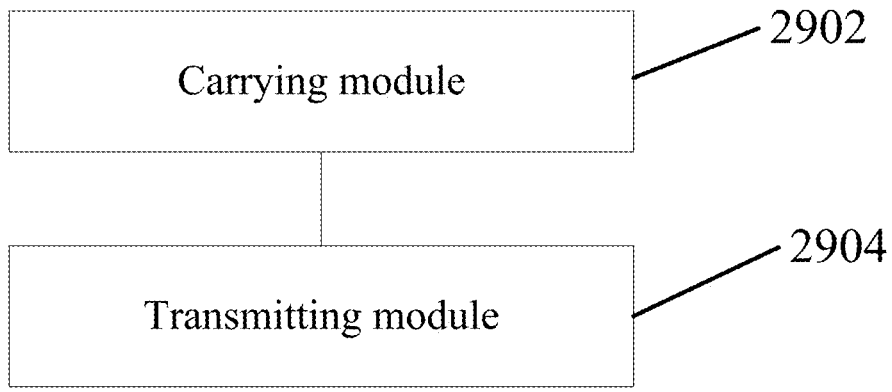
FIG. 29 is a structural block diagram of an apparatus for transmitting timing information according to an embodiment of the present invention.

FIG. 29 is a structural block diagram of an apparatus for transmitting timing information according to an embodiment of the present invention. As shown in FIG. 29, the apparatus includes: a carrying module 2902 and a transmitting module 2904. Where:

the carrying module 2902 is configured to carry timing information by using a DMRS, where the timing information is used to indicate a terminal to determine a time domain location; and the transmitting module 2904 is connected to the carrying module 2902, and configured to transmit the DMRS carrying the timing information to the terminal.

In other embodiments, the timing information includes at least: a serial number of a synchronization signal burst set; a serial number of a synchronization signal burst in a synchronization signal burst set; a serial number of a slot in a synchronization signal burst; a serial number of an SS block in a slot; a serial number of an SS block in a synchronization signal burst set; a serial number of an SS block in a synchronization signal burst; a serial number of a slot in a synchronization signal burst set; a synchronization signal block index; N least significant bits of a synchronization signal block index, where N is a positive integer; M most significant bits of a synchronization signal block index, where M is a positive integer; X middle significant bits of a synchronization signal block index, where X is a positive integer; part or all of information of a system frame number (SFN); radio frame timing information; or half frame timing information.

In other embodiments, the carrying module 2902 carries the timing information by using the DMRS in the following manners: carrying the timing information by using at least one of the following attributes of the DMRS: a DMRS sequence; a mapping resource of the DMRS sequence; or an orthogonal sequence used by the DMRS sequence.

In other embodiments, the DMRS sequence includes one of: DMRS sequences commonly mapped to two PBCH symbols; and DMRS sequences respectively mapped to two PBCH symbols.

In other embodiments, the carrying module 2902 carries the timing information by using the DMRS in one of the following manners: presetting a plurality of the DMRS sequences and a correspondence relationship between the respective DMRS sequences and values of the timing information, and carrying the timing information by using DMRS sequences commonly mapped to two PBCH symbols; or DMRS sequences mapped to two PBCH symbols forming a DMRS sequence combination, presetting a plurality of DMRS sequence combinations and a correspondence relationship between the respective DMRS sequence combinations and values of the timing information, and carrying the timing information by using the DMRS sequence combination mapped to the two PBCH symbols respectively.

In other embodiments, the apparatus carries the timing information by using the mapping order of the DMRS sequence in one of the following manners: presetting a plurality of mapping orders and a correspondence relationship between different mapping orders and different values of the timing information, and carrying the timing information by using the mapping orders, where the mapping orders refer to orders of mapping DMRS sequences to DMRS time domain resources and/or frequency domain resources on two PBCH symbols; or presetting a plurality of mapping order combinations and a correspondence relationship between different mapping order combinations and values of the timing information, and carrying the timing information by using the mapping order combinations, where the mapping order combinations refer to combinations of orders of mapping DMRS sequences to DMRS time domain resources and/or frequency domain resources on two PBCH symbols respectively.

In other embodiments, the apparatus uses the orthogonal sequence used by the DMRS sequence to carry the timing information in one of the following manners: presetting a plurality of orthogonal sequences having lengths correspond to PBCH symbol numbers, where different orthogonal sequences represent different values of the timing information; and mapping the processed DMRS sequences to DMRS resources of the two PBCH symbols respectively by using the preset orthogonal sequences, and carrying the timing information by using the processed DMRS sequences.

In other embodiments, the preset orthogonal sequences include at least one of: [1, 1]; and [1, −1].

In other embodiments, the apparatus processes the two DMRS sequences on the two PBCH symbols by using the preset orthogonal sequences in one of the following manners: multiplying respective elements of a DMRS sequence on a first PBCH symbol by a first element of the orthogonal sequences, and mapping the multiplying results to DMRS resource elements of the first PBCH symbol respectively; and multiplying respective elements of a DMRS sequence on a second PBCH symbol by a second element of the orthogonal sequences, and mapping the multiplying results to DMRS resource elements of the second PBCH symbol respectively; or multiplying respective elements of a DMRS sequence on a first PBCH symbol by a first element of a first orthogonal sequence to obtain a first sequence, multiplying respective elements of a DMRS sequence on a second PBCH symbol by a second element of the first orthogonal sequence to obtain a second sequence, and adding corresponding elements of the first sequence and the second sequence respectively, and mapping the adding results to DMRS resource elements of the first PBCH symbol respectively; and multiplying respective elements of a DMRS sequence on a second PBCH symbol by a first element of a second orthogonal sequence to obtain a third sequence, multiplying respective elements of a DMRS sequence on a second PBCH symbol by a second element of the second orthogonal sequence to obtain a fourth sequence, adding corresponding elements of the first sequence and the second sequence respectively, and mapping the adding results to DMRS resource elements of the second PBCH symbol respectively.

In other embodiments, the apparatus further includes a processing module configured to carry the timing information by using an attribute of the DMRS and an attribute of the PBCH.

In other embodiments, the attribute of the PBCH includes at least one of: bit information carried by the PBCH; a cyclic shift of a coded bit of the PBCH; a scrambling code of the PBCH; and a cyclic redundancy check mask of the PBCH.

In other embodiments, the mapping resource of the DMRS sequence includes at least: a part of resource elements (REs) in a frequency band outside a synchronization signal in a PBCH symbol to which the DMRS sequence is mapped; a part of REs in a PBCH bandwidth in a PBCH symbol to which the DMRS sequence is mapped; or in a part of PBCH symbols, a part of resource elements (REs) in a frequency band outside a synchronization signal to which the DMRS sequence is mapped; and in remaining PBCH symbols, a part of REs in a PBCH bandwidth to which the DMRS sequence is mapped.

Figure 30:
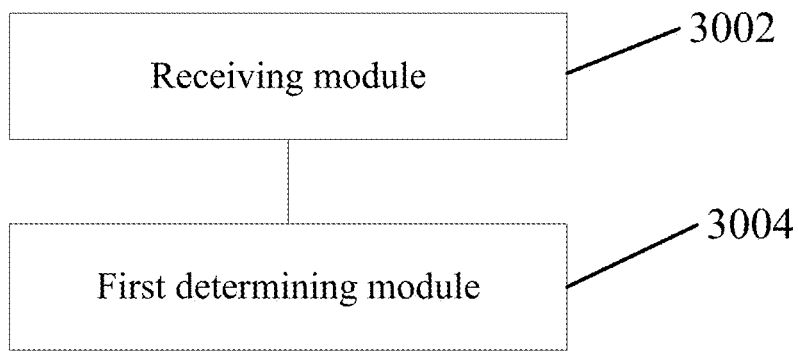
FIG. 30 is a structural block diagram of an apparatus for determining timing information according to an embodiment of the present invention.

FIG. 30 is a schematic diagram of a structure of a determining apparatus according to an embodiment of the present invention. As shown in FIG. 30, the apparatus includes: a receiving module 3002 and a first determining module 3004. Where:

the receiving module 3002 is configured to receive a DMRS transmitted by a base station; and the first determining module 3004 is connected to the receiving module 3002, and configured to determine timing information carried in the DMRS, where the timing information is used to indicate a terminal to determine a time domain location.

In other embodiments, the timing information includes at least: a serial number of a synchronization signal burst set; a serial number of a synchronization signal burst in a synchronization signal burst set; a serial number of a slot in a synchronization signal burst; a serial number of an SS block in a slot; a serial number of an SS block in a synchronization signal burst set; a serial number of an SS block in a synchronization signal burst; a serial number of a slot in a synchronization signal burst set; a synchronization signal block index; N least significant bits of a synchronization signal block index, where N is a positive integer; M most significant bits of a synchronization signal block index, where M is a positive integer; X middle significant bits of a synchronization signal block index, where X is a positive integer; part or all of information of a system frame number (SFN); radio frame timing information; or half frame timing information.

In other embodiments, the first determining module 3004 includes: a determining unit, configured to extract the timing information by using at least one of the following attributes of the identified DMRS: a DMRS sequence; a mapping resource of the DMRS sequence; or an orthogonal sequence used by the DMRS sequence.

In other embodiments, the DMRS sequence includes one of: DMRS sequences commonly mapped to two PBCH symbols; and DMRS sequences respectively mapped to two PBCH symbols.

In other embodiments, the first determining module 3004 determines the timing information by using the DMRS sequence in one of the following manners: determining the timing information by using DMRS sequences commonly mapped to the two PBCH symbols and a correspondence relationship between preset DMRS sequences and values of the timing information; or determining the timing information by using DMRS sequences commonly mapped to two PBCH symbols respectively and a correspondence relationship between preset DMRS sequence combinations and values of the timing information.

In other embodiments, the apparatus determines the timing information by using the mapping order of the DMRS sequence in one of the following manners: determining the timing information by using mapping orders of DMRS sequences commonly mapped to two PBCH symbols and a correspondence relationship between preset mapping orders of DMRS sequences and values of the timing information; or determining the timing information by using mapping orders of DMRS sequences independently mapped to two PBCH symbols respectively and a correspondence relationship between preset mapping order combinations of DMRS sequences on respective PBCH symbols and values of the timing information.

In other embodiments, the apparatus determines the timing information according to the orthogonal sequence used by the DMRS sequence in one of the following manners: determining the timing information by using orthogonal sequences used by DMRS sequences mapped to two PBCH symbols and a correspondence relationship between preset orthogonal sequences and values of the timing information.

In other embodiments, the preset orthogonal sequences include at least one of: [1, 1]; and [1, −1].

Figure 31:
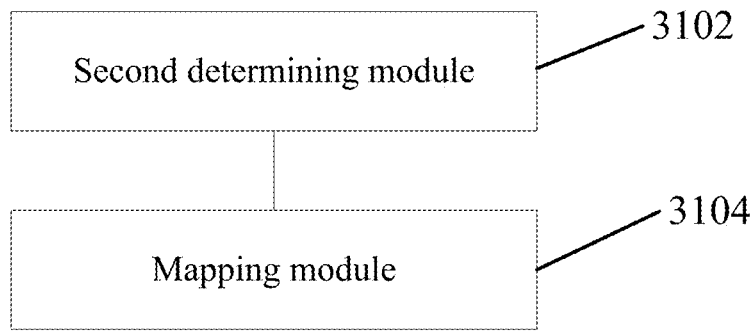
FIG. 31 is a structural block diagram of an apparatus for mapping a coded bit of a PBCH according to an embodiment of the present invention.

FIG. 31 is a structural block diagram of an apparatus for mapping a coded bit of a PBCH according to an embodiment of the present invention. As shown in FIG. 31, the apparatus includes: a second determining module 3102 and a mapping module 3104. Where the second determining module 3102 is configured to determine a coded bit of the PBCH; and the mapping module 3104 is connected to the second determining module 3102, and configured to map a coded bit of the PBCH to a resource of the PBCH in a predetermined order.

In other embodiments, the mapping module 3104 includes: a first mapping unit, which is configured to map the coded bit of the PBCH to the resource of the PBCH corresponding to a synchronization signal bandwidth; and a second mapping unit, which is configured to map the coded bit of the PBCH to the resource of the PBCH outside a synchronization signal bandwidth.

In other embodiments, the mapping module 3104 includes: a third mapping unit, which is configured to map the coded bit of the PBCH to the resource of the PBCH corresponding to a synchronization signal bandwidth of which a time domain location satisfies a first predetermined condition; a fourth mapping unit, which is configured to map the coded bit of the PBCH to the resource of the PBCH outside a synchronization signal bandwidth of which a time domain location satisfies a first predetermined condition; a fifth mapping unit, which is configured to map the coded bit of the PBCH to the resource of the PBCH corresponding to a synchronization signal bandwidth of which a time domain location satisfies a second predetermined condition; and a sixth mapping unit, which is configured to map the coded bit of the PBCH to the resource of the PBCH outside a synchronization signal bandwidth of which a time domain location satisfies a second predetermined condition.

It should be noted that, each of the foregoing modules may be implemented by software or hardware; for the latter, it may be implemented in the following manner, but is not limited hereto: the foregoing modules are located in a same processor; or each of the foregoing modules is respectively located in different processors in any combination.

An embodiment of the present invention further provides a storage medium, comprising a storage program, wherein the program performs the method of any one of claims 1 to 14 during running.

In other embodiments, the storage medium described above may be configured to store a program code for performing each of the above steps.

In other embodiments, the foregoing storage medium may include, but it is not limited to: any medium that can store program codes, such as a USB flash drive, a read-only memory (ROM), a random access memory (RAM), a removable hard disk, a magnetic disk, or an optical disc.

An embodiment of the present invention further provides a processor configured to run a program, where the step according to any one of the foregoing methods are executed during running.

The specific example in the present embodiment may refer to the example described in the foregoing embodiment and optional implementation manner, and it will not be described herein.

Obviously, those skilled in the art should understand that the foregoing each module or each step of the present invention may be implemented by universal computing devices, and they may be centralized on a single computing device or distributed over a network consisting of a plurality of computing devices; optionally, they may be implemented by executable program codes of a computing device, and thus they can be stored in a storage device for execution by the computing device; and in some cases, the illustrated or described steps may be executed in an order different from the one herein, or they are respectively fabricated into individual integrated circuit modules, or a plurality of modules or steps thereof are implemented by being fabricated into a single integrated circuit module. As such, the present invention is not limited to any specific combination of hardware and software.

It should be understood that "one embodiment" or "an embodiment" mentioned in the whole specification means that particular features, structures, or characteristics related to the embodiment are included in at least one embodiment of the present invention. Therefore, "in one embodiment" or "in an embodiment" appearing throughout this specification may be not necessarily a same embodiment. In addition, these particular features, structures, or characteristics may be combined in one or more embodiments in any appropriate manner. It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention. The sequence numbers of the above embodiments of the present invention are only used for description instead of representing preference of the embodiments.

It is to be noted that the term "comprise", "contain" or any other alterations intend to cover non-exclusive containing, so that the process, method, article or device comprising a series of elements not only comprises those elements, but also comprises other elements which are not definitely listed, or also comprises inherent elements for the process, method, article or device. Unless defined otherwise, the elements defined by the term "comprise a . . . " would not exclude the presence of other identical elements in the process, method, object or equipment including the stated elements.

The units described as separate parts may be or may not be separated physically, and a component displayed as a unit may be or may not be a physical unit, namely, may be located in one place, or may be distributed on a plurality of network units. Some or all of the units may be selected according to actual needs to achieve the purpose of the solution of the embodiment.

In addition, in various embodiments of the present invention, the functional units may be integrated in one processing unit, or the functional units may separately and physically exist, or two or more units may be integrated in one unit. The above integrated unit can be implemented in the form of hardware or in the form of hardware plus software functional units.

Those of ordinary skill in the art may understand that all or a part of the steps in the above-mentioned method embodiments may be performed with a program instruction related hardware, the foregoing program may be stored in a computer readable storage medium, and when being executed, the program may execute the steps included in the above-mentioned method embodiments; and the foregoing storage medium includes a variety of media capable of storing program codes, such as a portable storage device, a read only memory (Read Only Memory, ROM for short), a magnetic disk or an optical disk.

The foregoing description is only the specific implementation method of the present invention, rather than the limits of the protection scope of the present invention, any change or alteration that can be readily thought of by those skilled in the art within the disclosed technical scope of the present invention falls into the protection scope of the present invention. Accordingly, the protection scope of the claims should prevail over the protection scope of the present invention.

We claim:

1. A method for transmitting timing information, comprising:
   carrying timing information by using a demodulation reference signal, DMRS; and
   transmitting the DMRS carrying the timing information to the terminal,
   wherein the timing information comprises
   N least significant bits of the synchronization signal block index, where N is a positive integer;
   and
   half frame timing information,
   wherein the carrying the timing information by using the DMRS comprises:
   carrying the timing information by using a DMRS sequence of the DMRS, wherein the DRMS sequence is mapped to a resource comprising in a part of physical broadcast channel, PBCH, symbols, a part of resource elements, REs, in a frequency band outside a synchronization signal to which the DMRS sequence is mapped; and in remaining PBCH symbols, a part of REs in a PBCH bandwidth to which the DMRS sequence is mapped.

2. The method according to claim 1, wherein the carrying the timing information by using the DMRS comprises:
   when a number of candidate synchronization signal blocks is 4, defining four different DMRS sequences to be in one-to-one correspondence with four synchronization signal blocks; and
   when a number of candidate synchronization signal blocks is 8, defining eight different DMRS sequences to be in one-to-one correspondence with eight synchronization signal blocks.

3. The method according to claim 1, comprising:
   carrying the timing information by using the DMRS sequence and bit information carried by a physical broadcast channel, PBCH.

4. The method according to claim 3, wherein the carrying the timing information by using the DMRS sequence and the bit information carried by the PBCH comprises:
   when a number of candidate synchronization signal blocks is 64, defining eight different DMRS sequences for indicating three least significant bits of a synchronization signal block index; and introducing three bits of explicit information in PBCH information bits for indicating three most significant bits of a synchronization signal block index.

5. The method according to claim 1, wherein the DMRS carries the timing information by dividing all defined DMRS sequences into two sequence groups, wherein a sequence group to which the DMRS sequence belongs being used to indicate first and second half frames in a radio frame.

6. A processor configured to perform the method of claim 1 during running.

7. A method for determining timing information, comprising:
   receiving a demodulation reference signal, DMRS, transmitted by a base station; and
   determining timing information carried in the DMRS,
   wherein the timing information comprises:
   N least significant bits of the synchronization signal block index, where N is a positive integer; and
   half frame timing information,
   wherein the determining the timing information carried in the DMRS comprises:
   determining the timing information by using a DMRS sequence of the identified DMRS,
   wherein the DRMS sequence is mapped to a resource comprising in a part of physical broadcast channel, PBCH, symbols, a part of resource elements, REs, in a frequency band outside a synchronization signal to which the DMRS sequence is mapped; and in remaining PBCH symbols, a part of REs in a PBCH bandwidth to which the DMRS sequence is mapped.

8. The method according to claim 7, wherein determining the time information by using the DMRS sequence of the identified DMRS comprises:
- when a number of candidate synchronization signal blocks is 4, determining the time information by using four different DMRS sequences being in one-to-one correspondence with four synchronization signal blocks; and
- when a number of candidate synchronization signal blocks is 8, determining the time information by using eight different DMRS sequences being in one-to-one correspondence with eight synchronization signal blocks.

9. The method according to claim 7, comprising:
determining the time information by using the DMRS sequence and bit information carried by a physical broadcast channel, PBCH.

10. The method according to claim 9, wherein the determining the time information by using the DMRS sequence and bit information carried by the PBCH comprises:
- when a number of candidate synchronization signal blocks is 64, determining three least significant bits of a synchronization signal block index by using eight defined different DMRS sequences; and determining three most significant bits of a synchronization signal block index by three bits of explicit information introduced in PBCH information bits.

11. An apparatus for transmitting timing information, comprising at least one processor configured to:
- carry timing information by using a demodulation reference signal, DMRS; and
- transmit the DMRS carrying the timing information to the terminal,
- wherein the timing information comprises
  - N least significant bits of the synchronization signal block index, where N is a positive integer; and
  - half frame timing information,
- wherein the at least one processor is further configured to carry the timing information by using a DMRS sequence of the DMRS,
- wherein the DRMS sequence is mapped to a resource comprising in a part of physical broadcast channel, PBCH, symbols, a part of resource elements, REs, in a frequency band outside a synchronization signal to which the DMRS sequence is mapped; and in remaining PBCH symbols, a part of REs in a PBCH bandwidth to which the DMRS sequence is mapped.

12. The apparatus according to claim 11, wherein the at least one processor is configured to carry the timing information by using the DMRS by:
- when a number of candidate synchronization signal blocks is 4, defining four different DMRS sequences to be in one-to-one correspondence with four synchronization signal blocks; and
- in condition that a number of candidate synchronization signal blocks is 8, defining eight different DMRS sequences to be in one-to-one correspondence with eight synchronization signal blocks.

13. The apparatus according to claim 11, wherein the at least one processor is configured to:
- carry the timing information by using the DMRS sequence and bit information carried by a physical broadcast channel, PBCH.

14. The apparatus according to claim 13, wherein the at least one processor is configured to carry the timing information by using the DMRS sequence and the bit information carried by the PBCH by:
- when a number of candidate synchronization signal blocks is 64, defining eight different DMRS sequences for indicating three least significant bits of a synchronization signal block index; and introducing three bits of explicit information in PBCH information bits for indicating three most significant bits of a synchronization signal block index.

15. The apparatus according to claim 11, wherein the at least one processor is configured to carry the timing information by using the DMRS by:
- dividing all defined DMRS sequences into two sequence groups, wherein a sequence group to which the DMRS sequence belongs being used to indicate first and second half frames in a radio frame.

16. An apparatus for determining timing information, comprising at least one processor configured to:
- receive a demodulation reference signal, DMRS, transmitted by a base station; and
- determine timing information carried in the DMRS,
- wherein the timing information comprises:
  - N least significant bits of the synchronization signal block index, where N is a positive integer; and
  - half frame timing information,
- wherein the at least one processor is further configured to:
  - determine the timing information by using a DMRS sequence of the identified DMRS,
  - wherein the DRMS sequence is mapped to a resource comprising in a part of physical broadcast channel, PBCH, symbols, a part of resource elements, REs, in a frequency band outside a synchronization signal to which the DMRS sequence is mapped; and in remaining PBCH symbols, a part of REs in a PBCH bandwidth to which the DMRS sequence is mapped.

17. The apparatus according to claim 16, wherein the at least one processor is configured to determine the time information by using the DMRS sequence and bit information carried by a physical broadcast channel, PBCH.

18. The apparatus according to claim 17, wherein the at least one processor is configured to determine the time information by using the DMRS sequence and the bit information carried by the PBCH by:
- when a number of candidate synchronization signal blocks is 64, determining three least significant bits of a synchronization signal block index by using eight defined different DMRS sequences; and determining three most significant bits of a synchronization signal block index by three bits of explicit information introduced in PBCH information bits.

* * * * *

UNITED STATES PATENT AND TRADEMARK OFFICE
CERTIFICATE OF CORRECTION

Page 1 of 1

PATENT NO. : 11,025,402 B2
APPLICATION NO. : 16/714093
DATED : June 1, 2021
INVENTOR(S) : Xing Liu et al.

It is certified that error appears in the above-identified patent and that said Letters Patent is hereby corrected as shown below:

In the Claims

Claim 1, at Column 44, Line 9, please delete "wherein the DRMS sequence" and replace with -- wherein the DMRS sequence --

Claim 7, at Column 44, Line 61, please delete "wherein the DRMS sequence" and replace with -- wherein the DMRS sequence --

Claim 11, at Column 45, Line 41, please delete "wherein the DRMS sequence" and replace with -- wherein the DMRS sequence --

Claim 16, at Column 46, Line 36, please delete "wherein the DRMS sequence" and replace with -- wherein the DMRS sequence --

Signed and Sealed this
Eighth Day of February, 2022

Drew Hirshfeld
*Performing the Functions and Duties of the
Under Secretary of Commerce for Intellectual Property and
Director of the United States Patent and Trademark Office*